United States Patent
Ramrakhyani et al.

(10) Patent No.: US 10,733,313 B2
(45) Date of Patent: Aug. 4, 2020

(54) COUNTER INTEGRITY TREE FOR MEMORY SECURITY

(71) Applicant: Arm Limited, Cambridge (GB)

(72) Inventors: Prakash S. Ramrakhyani, Austin, TX (US); Roberto Avanzi, Munich (DE); Wendy Arnott Elsasser, Austin, TX (US)

(73) Assignee: Arm Limited, Cambridge (GB)

( * ) Notice: Subject to any disclaimer, the term of this patent is extended or adjusted under 35 U.S.C. 154(b) by 339 days.

(21) Appl. No.: 15/892,770

(22) Filed: Feb. 9, 2018

(65) Prior Publication Data
US 2019/0251275 A1    Aug. 15, 2019

(51) Int. Cl.
G06F 21/62 (2013.01)
G06F 3/06 (2006.01)
G06F 21/64 (2013.01)
G06F 21/78 (2013.01)

(52) U.S. Cl.
CPC ......... *G06F 21/6218* (2013.01); *G06F 3/062* (2013.01); *G06F 3/0634* (2013.01); *G06F 3/0673* (2013.01); *G06F 21/64* (2013.01); *G06F 21/78* (2013.01)

(58) Field of Classification Search
CPC ...... G06F 21/6218; G06F 21/78; G06F 21/64; G06F 3/062; G06F 3/0634; G06F 3/0673
See application file for complete search history.

(56) References Cited

U.S. PATENT DOCUMENTS

| 8,819,455 B2 * | 8/2014 | Chhabra ............ G06F 21/71 713/193 |
| 10,243,990 B1 | 3/2019 | Chen et al. |
| 2009/0019551 A1 | 1/2009 | Haga et al. |
| 2010/0212017 A1 | 8/2010 | Li et al. |
| 2011/0138192 A1 | 6/2011 | Kocher et al. |

(Continued)

FOREIGN PATENT DOCUMENTS

WO    2017058408 A3    5/2017

OTHER PUBLICATIONS

Ruirui Huang and G. Edward Suh. 2010. IVEC: off-chip memory integrity protection for both security and reliability. In Proceedings of the 37th annual international symposium on Computer architecture (ISCA '10). ACM, New York, NY, USA, 395-406. DOI: https://doi.org/10.1145/1815961.1816015.

(Continued)

*Primary Examiner* — Christopher A Revak
(74) *Attorney, Agent, or Firm* — Leveque IP Law, P.C.

(57) ABSTRACT

A counter integrity tree for memory security includes at least one split-counter node specifying at least two counters each defined as a combination of a major count value shared between the at least two counters and a respective minor count value specified separately for each of the at least two counters. This increases the number of child nodes which can be provided per parent node of the tree, and hence reduces the number of tree levels that have to be traversed in a tree covering a given size of memory region. The minor counter size can be varied dynamically by allocating nodes in a mirror counter integrity tree for accommodating larger minor counters which do not fit in the corresponding node of the main counter integrity tree.

20 Claims, 15 Drawing Sheets

(56) References Cited

U.S. PATENT DOCUMENTS

| | | | | |
|---|---|---|---|---|
| 2012/0079283 | A1* | 3/2012 | Hashimoto | G06F 12/1425 |
| | | | | 713/189 |
| 2014/0040632 | A1* | 2/2014 | Chhabra | G06F 12/1408 |
| | | | | 713/189 |
| 2014/0208109 | A1* | 7/2014 | Narendra Trivedi | ......... |
| | | | | H04L 9/0643 |
| | | | | 713/170 |
| 2014/0223197 | A1* | 8/2014 | Gueron | G06F 21/64 |
| | | | | 713/193 |
| 2015/0317256 | A1 | 11/2015 | Boivie et al. | |
| 2015/0370726 | A1* | 12/2015 | Hashimoto | G06F 21/575 |
| | | | | 711/163 |
| 2016/0275018 | A1 | 9/2016 | Chhabra et al. | |
| 2016/0283405 | A1 | 9/2016 | Oh et al. | |
| 2016/0328335 | A1 | 11/2016 | Bhattacharyya et al. | |
| 2017/0083724 | A1 | 3/2017 | Chhabra et al. | |
| 2017/0091119 | A1 | 3/2017 | Chhabra et al. | |
| 2018/0189132 | A1 | 7/2018 | Malladi et al. | |
| 2019/0043600 | A1* | 2/2019 | Saileshwar | H04L 9/3242 |

OTHER PUBLICATIONS

Chenyu Yan, Brian Rogers, Daniel Englender, Yan Solihin, Milos Prvulovic, "Improving Cost, Performance, and Security of Memory Encryption and Authentication," Proceedings of the 33rd International Symposium on Computer Architecture (ISCA-33), Jun. 2006.

Gueron, S. (2016). A Memory Encryption Engine Suitable for General Purpose Processors. IACR Cryptology ePrint Archive, 2016, 204.

W. Eric Hall and Charanjit S. Jutla. 2005. Parallelizable authentication trees. In Proceedings of the 12th international conference on Selected Areas in Cryptography (SAC'05), Bart Preneel and Stafford Tavares (Eds.). Springer-Verlag, Berlin, Heidelberg, 95-109. DOI= 10.1007/11693383_7 http://dx.doi.org/10.1007/11693383_7.

Taassori et al., "VAULT: Reducing Paging Overheads in SGX with Efficient Integrity Verification Structures," ASPLOS '18, Mar. 24-28, 2018.

Bedichek, Robert, "Some efficient architecture simulation techniques," Winter 1990 USENIX Conference, pp. 53-63.

\* cited by examiner

COUNTER INTEGRITY TREE FOR MEMORY SECURITY

BACKGROUND

Technical Field

The present technique relates to the field of data processing. More particularly, it relates to memory security.

Technical Background

Some data processing systems may need to run software which involves the processing of secret or sensitive information which should not be exposed to a potential attacker. However, providing enough capacity to store all such information in a memory which cannot be tampered with by an attacker may be infeasible, and so sometimes it may be necessary to export some sensitive information to a memory which is vulnerable to attack. For example, while data stored on-chip may be secured against attacks, on-chip memory storage may be limited and so it may be required to write data to an off-chip external memory. An attacker may be able to read data from the external memory or intercept the data as it is passed to the external memory, and/or tamper with data values stored in the external memory in an attempt to cause incorrect behaviour when such externally stored data is subsequently brought back into the processing system. To provide security for data stored in a potentially unsafe memory, it is possible to encrypt the data values before they are stored to the memory, and provide integrity checks to check, when data is read from the unsafe memory, that the data has not been modified since it was stored to the memory. However, such memory security operations incur a performance cost, as they may require additional calculations and memory accesses to be performed each time data is written to, or read from, the memory.

SUMMARY

At least some examples provide an apparatus comprising:
memory access circuitry to control access to data stored in a memory; and
memory security circuitry to verify integrity of data stored in a protected memory region of the memory; wherein:
the memory security circuitry is configured to maintain a main counter integrity tree comprising a plurality of nodes, each node specifying a plurality of counters associated with respective data blocks of the protected memory region, the plurality of nodes comprising at least one parent node for which at least one of the counters is associated with a data block storing a child node providing further counters of the main counter integrity tree, and at least one leaf node for which at least one of the counters is associated with a data block storing data other than the main counter integrity tree;
in response to access to a target data block of the protected memory region, the memory security circuitry is configured to verify integrity of the target data block by comparing a stored authentication code associated with the target data block with a calculated authentication code generated based on the target data block and a target counter of the counter integrity tree which is associated with the target data block; and
at least one of the nodes of the main counter integrity tree comprises a split-counter node specifying at least two counters each defined as a combination of a major count value shared between the at least two counters and a respective minor count value specified separately for each of the at least two counters; and
in response to a size increase trigger event associated with a given split-counter node of the main counter integrity tree, the memory security circuitry is configured to increase a size of the minor counters of the given split-counter node and to allocate a subset of the minor counters of the given split-counter node in a corresponding split-counter node of at least one mirror counter integrity tree.

At least some examples provide a method for controlling access to data stored in a protected memory region of a memory, comprising:
maintaining a main counter integrity tree comprising a plurality of nodes, each node specifying a plurality of counters associated with respective data blocks of the protected memory region, the plurality of nodes comprising at least one parent node for which at least one of the counters is associated with a data block storing a child node providing further counters of the main counter integrity tree, and at least one leaf node for which at least one of the counters is associated with a data block storing data other than the main counter integrity tree; and
in response to access to a target data block of the protected memory region, verifying integrity of the target data block by comparing a stored authentication code associated with the target data block with a calculated authentication code generated based on the target data block and a target counter of the main counter integrity tree which is associated with the target data block;
wherein at least one of the nodes of the main counter integrity tree comprises a split-counter node specifying at least two counters each defined as a combination of a major count value shared between the at least two counters and a respective minor count value specified separately for each of the at least two counters; and
in response to a size increase trigger event associated with a given split-counter node of the main counter integrity tree, increasing a size of the minor counters of the given split-counter node and allocate a subset of the minor counters of the given split-counter node in a corresponding split-counter node of at least one mirror counter integrity tree.

At least some examples provide a computer program to control a data processing apparatus to perform method described above. The computer program may be stored on a storage medium. The storage medium may be a non-transitory storage medium.

Further aspects, features and advantages of the present technique will be apparent from the following description of examples, which is to be read in conjunction with the accompanying drawings.

DESCRIPTION OF EXAMPLES

Figure 1:
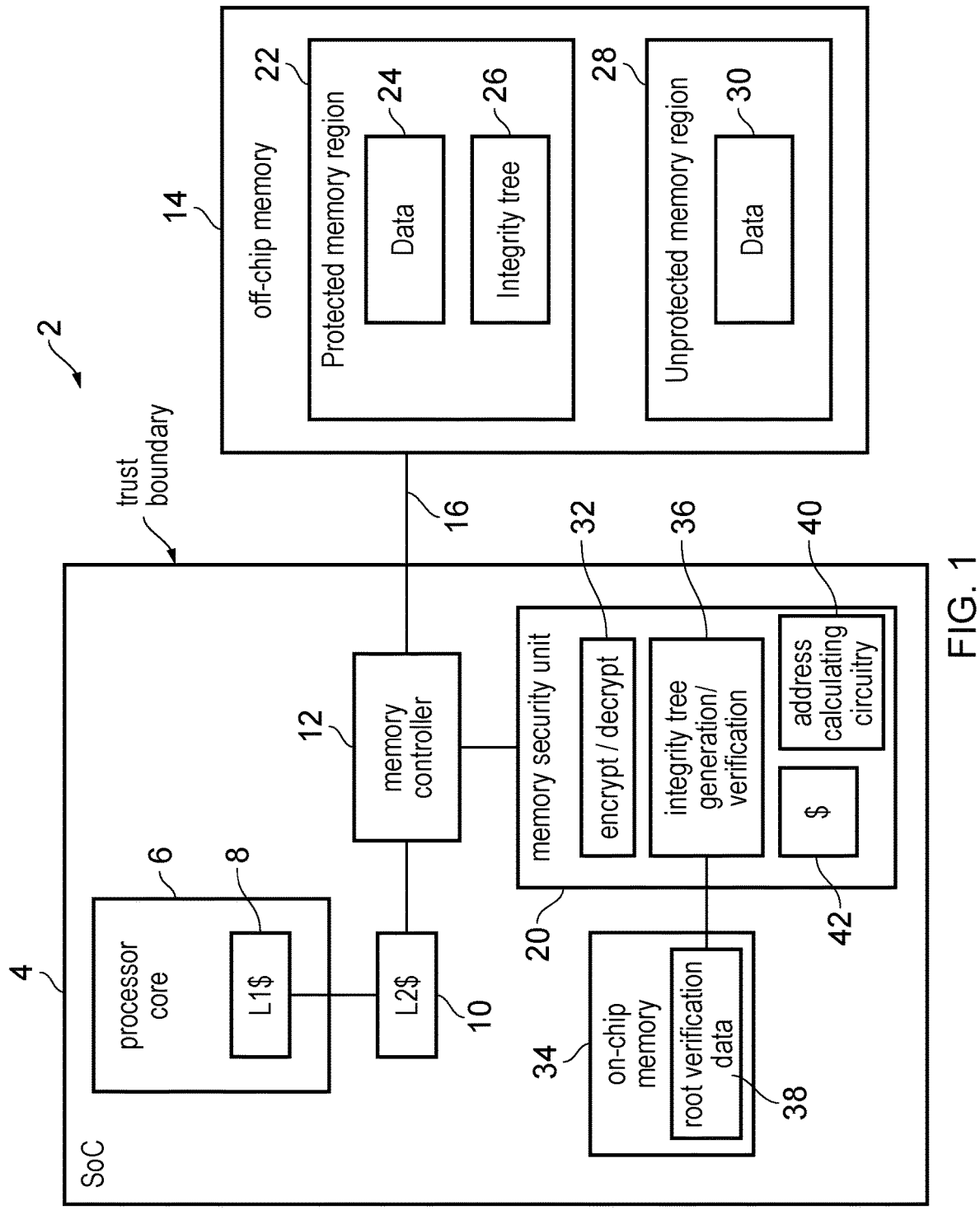
FIG. 1 schematically illustrates an example of an apparatus having memory security circuitry for verifying integrity of data stored in a protected memory region of a memory.

An apparatus may have memory access circuitry for controlling access to data stored in the memory, and memory security circuitry for verifying integrity of data stored in a protected memory region of the memory. For example, the integrity verification may be for detecting an attacker tampering with the data stored in the protected memory region by an attacker. For example, the memory could be an off-chip memory on a separate integrated circuit from the integrated circuit comprising the memory access circuitry.

The integrity verification may depend on a comparison between the stored data and integrity metadata maintained by the memory security circuitry. For example, when writing data to the protected memory region, the memory security circuitry may generate integrity metadata based on properties of data stored to the protected memory region, and when reading data from the protected memory region, the memory security circuitry may use the integrity metadata to check whether the data has changed since it was written. However, such integrity metadata can require a significant amount of storage space to provide all the metadata for protecting the entire address range of the protected memory region. Often the capacity to hold data in a storage unit which is not vulnerable to an attacker may be limited, so in practice it may be required to store at least part of the integrity metadata to the protected memory region itself. As this makes the metadata vulnerable to an attack, the integrity metadata may itself need to be subjected to integrity verification when it is read (in a similar way to the actual data of interest), typically using further metadata which may also be stored in the protected region. Hence, for each read of "real" data in the protected memory region, this may trigger multiple reads of integrity metadata in addition to the real data of interest, and corresponding comparisons to check whether the integrity metadata is valid, and so as the size of the protected memory region increases, it can become increasingly challenging to limit the performance impact of the integrity verification on the overall system performance.

In the techniques discussed below, the memory security circuitry may maintain a counter integrity tree which comprises a number of nodes. Each node specifies multiple counters which are associated with respective data blocks of the protected memory region. The nodes of the counter integrity tree include at least one parent node for which at least one of the counters specified by that parent node is associated with a data block which stores a child node of the counter integrity tree which provides further counters for further data blocks. Also, the nodes include at least one leaf node for which at least one of the counters is associated with a data block that stores data other than the counter integrity tree.

Each counter in the tree is used for generating an authentication code for checking the authenticity of a corresponding data block. Hence, in response to access to a target data block of the protected memory region, the memory security circuitry may verify the integrity of the target data block by comparing a stored authentication code associated with the target data block with a calculated authentication code which is generated based on the target data block and a target counter of the counter integrity tree which is associated with the target data block. Note that the target data block could be the data block which stores the "real" data of interest, or could be a data block which stores one of the nodes of the counter integrity tree itself, which may be accessed as part of the verification process for checking the integrity of some other "real" data block.

The use of an integrity tree helps to guard against replay attacks, which are a form of attack in which an attacker captures a current data value and its valid authentication code at one time (e.g. by reading the memory itself or by monitoring the interface between the memory and the source of the data), and later after that data value is no longer current, attempts to substitute the out-of-date data block and its associated valid authentication code for the correct values stored in memory, which could lead to incorrect behaviour in the apparatus. By providing an integrity tree in which the data from one node is protected by an authentication code calculated based on another node, replay of stale data can be detected from the inconsistency between the old pair of data and authentication code for one node and the calculated authentication code and counter from a parent node. One way of implementing an integrity tree is as a counter integrity tree, which is a type of integrity tree in which the tree is built up of counters such that a parent node provides the counters used for generating the authentication codes for each of its child nodes. However, to avoid frequent overflows of the counters, the counters may need to be provided with a certain number of bits. This can limit the efficiency with which the counter integrity tree can be implemented, as it limits how many counters can be provided per tree node.

In the technique discussed below, at least one of the nodes of the counter integrity tree is a split-counter node, which specifies at least two counters each defined as a combination of a major count value which is shared between the at least two counters and a respective minor count value specified separately for each of the at least two counters. Hence, the major count value specifies a common portion shared between each of the two or more counters corresponding to at least two of the data blocks covered by the split-counter node, and the respective minor count values each specify the portion which differs from counter to counter.

The use of such split-counter nodes in the counter integrity tree enables more efficient memory performance. As the minor count value specified separately per counter is smaller than if all the required number of bits had to be provided entirely separately for each counter (as some of the bits are covered by the shared major counter provided once for a group of counters), this means that the number of minor count values which can fit within a data block of a given size is greater and so effectively the number of data blocks whose counters can be specified within a single node of the counter integrity tree can be increased. In other words, the arity of the counter integrity tree nodes can be greater (the arity refers to the number of child nodes provided per parent node). Assuming a given size of protected memory region, if the arity of the split-counter nodes can be increased, the number of levels of the counter integrity tree which would need to be traversed to obtain all the counters for checking the integrity of the data block and the integrity of the counters themselves can be reduced. This means that less memory traffic is generated during traverse of the counter integrity tree and hence there is an improvement in performance by requiring fewer read operations for each access to "real" data in the protected memory region.

Also, some implementations may have a cache for storing a subset of data from the memory, with data access latency shorter for accesses in the cache than if the data has to be read from the memory itself. As the split-counter nodes allow a greater number of counters to be represented in a given size of data block, this means that more counters can be cached in a given amount of cache space, increasing the probability that the counter required for checking the integrity of a given data access is present in the cache and hence allowing more accesses to the protected memory region in memory to be omitted when the data is already cached.

In practice, the minor counters can be specified with fewer bits than are typically required for a given authentication code, so the split (major-minor) counter approach also tends to be more efficient than alternative "hash tree" implementations in which each parent node in the tree specifies the authentication codes for a number of child nodes, rather than specifying the counters for a number of child nodes. The arity of the tree in practice can be greater for the split counter nodes of the tree than would be practical for a hash tree given the number of bits for each hash that would typically be required to provide a sufficient level of security that, if a secret key used to generate the authentication code is unknown, it is cryptographically infeasible to deduce or guess the authentication code (hash) associated with a given data block (by brute force or otherwise).

Hence, by implementing the integrity metadata as a counter integrity tree with at least some of the nodes of the tree implemented as split-counter nodes as discussed above, the counter integrity tree can be more efficient to traverse during generation of the tree and/or use of the tree for verification of data integrity, improving system performance.

In response to a size increase trigger event associated with a given split-counter node of the main counter integrity tree, the memory security circuitry may increase a size of the minor counters of the given split-counter node, and allocate a subset of the minor counters of the given split-counter node in a corresponding split-counter node of at least one mirror counter integrity tree. This allows the size of minor counters in a particular node of the main tree to be increased, without reducing arity of that node (number of child nodes under that node), as any additional space required for storing the larger minor counters can be accommodated within a corresponding node of a mirror counter integrity tree. The minor counter size can be increased for selected nodes of the main counter integrity tree for which the size increase trigger event has been detected, but does not need to be increased for all nodes of the main counter integrity tree. Hence, the mirror counter integrity tree may be a sparsely populated tree which does not have valid data at every node of the mirror counter integrity tree. This approach can be useful because memory traffic does not have an even distribution across the memory address space—some blocks are accessed more frequently than others. Hence, this approach allows each node to start off using as small a minor counter size as possible, to improve performance by reducing the number of levels of the tree that need to be traversed when verifying integrity of a given data block, but for those nodes which correspond to frequently accessed areas of memory, the counter size can be increased using the mirror tree to accommodate the additional counters, to reduce the chance of overflow and hence reduce the chance of performance-intensive re-encryption or authentication code re-computation operations triggered on a minor counter overflow being necessary. Hence, the variable minor counter size approach can provide better performance overall than a tree with a certain fixed minor counter size for a given node of the tree.

The apparatus may have a second memory and the memory security circuitry may store, to the second memory, root verification data which either specifies the root node of the main counter integrity tree, or specifies information for verifying an integrity of the root node of the main counter integrity tree (in the second case, the root node itself may be stored in the protected memory region). The second memory may be inside the boundary of trust, so is not vulnerable to attack. For example, the second memory could be an on-chip memory, whereas the protected memory region could be in an off-chip memory. The root node is the node which is an ancestor node of every other node of the tree. Hence, the root verification data enables any part of the counter integrity tree lying within the protected memory region to be authenticated based on trusted data which is not vulnerable to attack. In some cases, the root node stored in the second memory could itself be a split-counter node as discussed above. Alternatively, the root node could be implemented using monolithic (non-split) counters. Also, the information stored in the second memory for verifying the integrity of the root node may not be the root node itself, but may comprise a stored authentication value for comparing with an authentication value derived from the root node stored in the protected memory region and/or may comprise a stored counter used for computing the authentication value to be derived from the root node. In cases where a mirror counter integrity tree has been allocated and the root node of the mirror counter integrity tree has been populated, the second memory could also store root verification data for verifying integrity of the root node of the mirror counter integrity tree, or could store the root node of the mirror counter integrity tree itself.

Hence, when the target data block is accessed, the memory security circuitry may perform one or more verification checks to verify the integrity of counters on a branch of the main counter integrity tree which includes the target counter and the root node (and depending on the overall size of the main counter integrity tree, one or more intervening counters on intervening nodes), and at least one of those verification checks may depend on the root verification data stored in the second memory.

When the target data block of the protected memory region is updated, the memory security circuitry may update the target counter and recalculate the stored authentication code which is associated with the target data block based on both the updated data written to the target data block and the updated target counter. Hence, by updating the target counter used for computing the authentication code each time the target data block is updated, this provides freshness in the calculation of the authentication code which makes deducing secret keys used to generate the authentication code harder.

The updating of the counter could be done in any way which provides a sequence of updates which avoids repetition of counter values and for which it can be detected when every possible value of the counter has already been used (reuse of the same counter value without some other change to the way data is encrypted or authenticated could run the risk of successful replay attacks). A relatively simple approach can be to update the counter by incrementing the target counter each time the corresponding data of the target data block is updated. Alternatively, other implementations could update the counter non-monotonically on each update of the corresponding data (e.g. a monotonically increasing reference counter could be transformed, e.g. by applying an XOR operation with a constant, to give a non-monotonically increasing sequence of count values which is written to the target counter on each update, in order to make it harder for an attacker to determine the pattern of variation of the counter).

If a counter overflows (returns to a previously used counter value), then the overflow may trigger some other action, such as changing the encryption keys used to encrypt the data, or changing a secret key or other parameter used for generating the authentication code, to make it safer to reuse old counter values as some other parameter of the encryption/authentication process has changed.

As the target counter associated with the target data block may be stored in a further data block of the protected memory region, the update to the counter may require a further write access to another data block in the protected memory region, which therefore requires a further counter associated with that data block to be updated, which may itself trigger a further write access, etc. Hence, the original write access may trigger a sequence of successive counter updates and authentication code recomputations, traversing up the tree until the root is reached.

It is not essential for all nodes of the counter integrity tree to use the split-counter approach. For example, the total number of data blocks which are to be protected within the protected memory region may not be an exact power of the arity (number of child nodes per parent node) implemented in the counter integrity tree, in which case there may be some nodes which may have a lower arity and so may not use the split-counter approach as storing a smaller number of monolithic counters may be sufficient to provide the arity required. Hence, not all the nodes need to use split-counters.

For those nodes which are implemented as split-counter nodes, when a target counter implemented in split form needs to be updated due to a write to the corresponding data in the corresponding target data block, the memory security circuitry may update the minor count value corresponding to the target counter. Also, the memory security circuitry may recalculate the stored authentication code which is associated with the target data block based on the updated data of the target data block, the corresponding major count value which corresponds to the target counter of interest, and the updated minor count value corresponding to the target counter of interest. If the update to the minor count value does not trigger an overflow, then there is no need to update any other authentication codes associated with other data blocks sharing the same major count value with the target data block.

However, when the update to the minor count value causes an overflow (reuse of a previously used minor count value), then the memory security circuitry may update the corresponding major count value for the target counter interest. As there are a number of data blocks, other than the target data block, which share that major count value for their counters, updating the major count value would mean the previously stored authentication codes will no longer match an authentication code computed from the major count value and those data blocks' data and minor counters. Therefore, the memory security circuitry may also recalculate the stored authentication codes associated with each of the other data blocks which are associated with counters sharing the corresponding major count value, in addition to recalculating the stored authentication code for the target data block itself. Hence, occasionally the sharing of the major count value between respective minor counters may mean require some additional computation of authentication codes for blocks other than the target data block itself. However, this performance penalty is incurred rarely, while the performance gain by increasing the arity of tree nodes using the split-counter approach helps speed up each traversal of the counter tree, so that on average the performance is better with the split-counter approach.

Also, in response to an overflow of the minor count value of a given node of the at least one mirror counter integrity tree (or in response to a rate of overflows of minor counters of the given node meeting a predetermined condition, such as exceeding a threshold), the memory security circuitry may also increase the size of the minor counters of that node and allocate a subset of the minor counters to a corresponding node of the at least one mirror counter integrity tree. That is, when a minor counter overflows (or overflows too frequently), this can be an indication that the current size of the minor counters is too small, so it can be useful to increase the size of the minor counters to reduce the likelihood that other minor counters in the same block will overflow as frequently. It is not essential to always increase the size of the minor counters in response to any overflow of a minor counter—in some cases a number of conditions may need to be satisfied to trigger a minor counter size increase for a given node, one of which may be the overflow of a minor counter of that node. The rate of minor counter overflows could be monitored in different ways, e.g. as a rate relative to time (number of overflows in a given period of time) or relative to the number of memory accesses (number of overflows detected for a certain number of memory accesses), or relative to the number of write operations to memory. The minor counter size could also be increased in response to the rate of data re-encryptions or authentication code re-computations exceeding a set threshold (again, the rate of data re-encryptions or authentication code re-computations could be defined relative to time, number of memory accesses, or number of write operations to memory).

The split-counter node could be provided at any node of the counter integrity tree, including both parent nodes and leaf nodes. However, it can be particularly useful for at least one of the parent nodes to be a split-counter node. This can enable faster fanning out of the tree so that fewer levels of the tree are needed to cover a protected memory region of a given size. In some implementations, the memory security circuitry may maintain a counter integrity tree which comprises at least two split-counter nodes at different levels of the counter integrity tree.

In some implementations, each node of the counter integrity tree could have the same arity, i.e. each node may specify counters for the same number of data blocks or child nodes. However, it is also possible for at least two nodes of the tree to specify counters for different numbers of child nodes.

In particular, it can be useful for at least a portion of the main counter integrity tree to be implemented such that nodes which are higher up in the tree (i.e. closer to the root node) have a lower arity than nodes which are further from the root and closer to the leaves of the tree. Hence, the arity of the tree may be variable from level to level and may reduce as one traverses the tree to approach the root node.

For example, the main counter integrity tree may comprise a first split-counter node which specifies counters for a first number of data blocks and a second split-counter node specifying counters for a second number of data blocks which is greater than the first number, where the first split-counter node is the parent node of the second split-counter node. By reducing the arity of parent nodes relative to their children, there are fewer counters in the parent node compared to the child node and so there is more space to include counters with a greater number of bits. Hence, the minor count values specified by the first split-counter node may have a greater number of bits than the minor count value specified by the second split-counter node. This can be very useful because as one goes up the tree towards the root, the amount of write traffic to each level of the tree tends to increase exponentially, because each node at a higher level of the tree covers a wider range of addresses than nodes further down the tree. By making the arity smaller, and the minor count values larger, as one ascends the tree towards the root node, this reduces the likelihood of counter overflow at those higher levels, to reduce how often authentication codes need to be recomputed for the nodes at the higher levels. Hence, providing higher arity at lower levels and lower arity at higher levels can provide a better balance of performance considering both the latency on an individual read operation and the latency when a counter overflow occurs.

Similarly, if there are three or more levels in the tree comprising grandparent, parent and child nodes respectively, then the grandparent node may have a further reduction in the arity relative to the parent node, so that the grandparent node may specify fewer counters (covering a smaller number of child nodes) than the parent node, and the minor count values for the grandparent node may have a greater number of bits than the minor count values in the parent node. Hence, with the first split-counter node corresponding to the parent node and the second split-counter node corresponding to a child node described above, a further grandparent node comprising a third split-counter node may specify counters for a third number of data blocks which is smaller than the first number used for the first (parent) split-counter node.

In some implementations, the arity for each node of the tree may be an exact power of 2. Hence, each node of the main counter integrity tree could specify counters for a number of data blocks which is an exact power of 2, e.g. 8, 16, 32 or 64.

However, in one implementation at least one node of the main counter integrity tree may specify counters for a number of data blocks other than an exact power of 2, for example 36 or 48. That is, the arity of at least one split-counter-node may be a value other than an exact power of 2. Using tree nodes which correspond to a non-power-of-2 number of data blocks would be extremely counter intuitive for a skilled person, as memory space is usually organised in blocks corresponding to a power-of-2 unit of addresses to simplify the address calculation arithmetic. However, it has been recognised that often providing an arity lying between two adjacent powers of two can provide a better balance of performance, because implementing a tree node with the arity corresponding to the next highest power of two may reduce the size of each counter too much so that there may be a significant number of overflows which may dominate the execution time, while using the next lowest power of two could result in counters being over-provisioned with bits so that the chance of overflow is negligible but many of the bits of the counters are rarely used. Hence, sometimes using a non-power of two number for the number of data blocks covered by a given node of the counter integrity tree can better balance the total number of tree levels to be traversed on a read/write access against the likelihood of overflows, to improve performance on average across a period of operation. While using a non-power of two arity for tree nodes can complicate the address calculation arithmetic for determining the address at which a given node of the counter integrity tree is stored, this additional overhead may be outweighed by the additional performance benefit in better balancing the number of memory accesses required to traverse the tree against the likelihood of overflow.

The memory security circuitry in some examples may read the stored authentication code for the target data block from the same cache line of the protected memory region as the target data block. A cache line may be a unit of the memory address space which can be returned as a single data access by the memory. By storing the stored authentication code alongside the target data itself within the same cache line, this avoids needing to perform a second memory access in order to read the stored authentication code for comparing with the calculated authentication code for the target data block.

However, other implementations could store the stored authentication code in a separate cache line from the target data block. For example, some memory chips may provide a secondary storage region for storing error detecting/correcting codes associated with data in a primary storage region. Such memory chips may be designed to efficiently return both the primary data and its associated error detecting/correction code in response to a memory access, even though they are stored in separate cache lines. Hence, in some implementations the stored authentication code could be stored in the secondary storage region of a memory chip designed for use with error detecting/correction codes.

When a mismatch is detected between the stored authentication code and the calculated authentication code for the target data block being accessed, then the memory security circuitry may trigger a security violation response. The security violation response could be any of a number of operations for preventing successful access to the memory or for taking counter measures against possible attack. For example, the security violation response could include any of the following: denying access to encryption keys for permitting decryption of the data access in the target data block; denying the request to access the target data block; overwriting the target data block with dummy data, random data or any other data uncorrelated with the previous contents of the target data block to prevent that data being accessed; raising an exception to trigger a software process such as an operating system to take counter measures against the attack; overwriting or clearing all the data (not just the target data block) in the protected memory region in case it has been compromised; and/or disabling the apparatus or the memory so as to prevent any further correct usage of the apparatus or the memory (e.g. by taking a physical counter measure such a burning through fused connections in the memory or the apparatus to prevent correct usage of the device once it has been subject to attack). The precise details of the actions taken when a security violation is identified may vary from implementation to implementation.

The memory security circuitry may have encryption/decryption circuitry to encrypt data written to a data block of the protected memory region and to decrypt data read from a data block of the protected memory region. Hence, data may not be exposed in the clear to an attacker who could read it from the protected memory region. The counter integrity tree provides further protection by providing measures for detecting tampering of the data while it is in the protected memory region and replay attacks. Any node of the counter integrity tree which is written to the protected memory region may also be subject to encryption and decryption in a similar way to the "real" data itself.

In some implementations, all the address space mapped to the memory subject to control by the memory security circuitry may be considered to be the protected memory region, and so all accesses to that memory could be subject to encryption, decryption, and integrity verification using the counter integrity tree. The memory access circuitry may also control access to at least one other memory, such as a separate memory unit, which is not subject to the same protections. Alternatively, within the same memory device, different address ranges within the memory could be mapped to a protected region and an unprotected memory region respectively. In the unprotected memory region, the memory access circuitry may control access to data in that region independent of any of the protections provided by the memory security circuitry, e.g. not requiring encryption/decryption, and not requiring any integrity verification based on the counter integrity tree and the authentication codes. Hence, accesses to the unprotected memory region could be controlled independent of the counter integrity tree. For example, there may be some non-sensitive data which does not need to be protected against the attacker. By writing that data to the unprotected memory region, performance is improved, because it is not necessary to perform any additional memory accesses to read/write the integrity tree data and the authentication codes for verifying the authenticity of the data.

The technique discussed above can be implemented in a physical device having bespoke circuitry providing the functions of the memory security circuitry in hardware. Hence, the software executing on a processing apparatus need not be aware that the encryption or decryption or any integrity verification operations are being performed, as this could be done automatically by the memory security circuitry provided in hardware. Hence, when the software instructs data to be written to an address mapped to the protected memory region, the memory security circuitry could encrypt the data prior to writing it to the memory, and control generation of the corresponding counter integrity tree nodes and/or verification based on the counter integrity tree that the memory has not been compromised by an attacker. Similarly, on reads to the protected memory region by the software, the memory security hardware may control decryption of the read data and the checking of the counter integrity tree nodes for verifying that the read data is still valid.

However, in other examples, the encryption/decryption, generation of stored authentication codes and the counter integrity tree, and integrity verification operations based on the stored authentication codes and counter integrity tree, may be performed by software executing on a general purpose processing circuitry within an apparatus, which does not itself have the hardware for automatically performing such memory security operations. For example, the software may be platform-level code such as an operating system or hypervisor, which may support other applications running below it under its control. For example a virtual machine or simulator program may execute application code as if the hardware actually has the memory security circuitry but may detect memory accesses to addresses mapped to the protecting memory region and for such accesses perform additional encryption or decryption of data or the operations for maintaining the counter integrity tree and verifying integrity of data based on the stored authentication codes and the counter integrity tree, before the data is actually written out to the protected memory region. Hence, in some examples the technique may provide a storage medium which stores a computer program to control a data processing apparatus to provide a method as discussed above. The computer program could also be recorded in non-transitory form such as by downloading it over a network.

FIG. 1 schematically illustrates an example of a data processing system 2, which comprises an integrated circuit or system on chip 4 which includes at least one processor core 6 for executing program instructions to carry out data processing operations. While FIG. 1 only shows one processor core in some cases the system on-chip 4 may comprise multiple processors. Each processor core or processor core cluster may have a cache 8 (or multiple levels of cache 8, 10). A memory controller 12 acts as memory access circuitry for controlling access to an off-chip memory 14 which is on a separate integrated circuit from the system on-chip 4. While accesses to data on-chip may be difficult to tamper with by an attacker, the edge of the system on-chip may act as a trust boundary and any data passing beyond that boundary may be vulnerable to attack by intercepting data on the physical channel 16 between the memory controller 12 and the off-chip memory 14, or by reading or modifying the data while it is stored in the off-chip memory 14. While FIG. 1 shows an example where the trust boundary corresponds to the edge of the system on-chip, in other cases there could be trust boundaries within a system on-chip which could expose data beyond the trust boundary to potential attacks.

The system on-chip 4 may include a memory security unit 20 provided for protecting data stored to a protected memory region 22 of the off-chip memory 14 from a malicious adversary who has physical access to the system and the ability to observe and/or replay the data or code being exchanged between the microprocessor and the off-chip system memory 14. The protected memory region 22 includes the data 24 to be protected as well as integrity tree metadata 26 used in the verification of the data 24. An unprotected memory region 28 is also provided in the off-chip memory 14, and data 30 stored in the unprotected region is not protected by the memory security unit 20 and so is free to be accessed and modified by an attacker. In some implementations, the mapping of addresses to the protected and unprotected memory regions 22, 28 may be fixed by the hardware, so that it is not possible for an operating system or other software executed by the processor core 6 to vary which addresses are mapped to the protected memory region 22 or unprotected memory region 28. Alternatively, if the operating system controlling the address mapping can be trusted, the address mapping controlling which addresses are mapped to the protected region or the unprotected region may be varied by the processor under control of software, and so the protected and unprotected regions need not always map to the same physical locations in the off-chip memory 14. In some implementations, there may not be any unprotected memory region 28 provided in the off-chip memory 14—in this case the entire off-chip memory could be considered the protected memory region 22.

The memory security unit 20 includes encryption/decryption circuitry 32 for encrypting data being written to the off-chip memory 14 and decrypting data read back from the off-chip memory. This provides privacy by preventing a malicious observer from seeing in the clear the data being read from or stored onto the off-chip memory 14. Encryption keys used by the encryption and decryption may be stored within an on-chip memory (e.g. SRAM) 34 on the system on-chip or within the memory security unit 20 itself. Any known technique may be used for the encryption and decryption, and any known approach for protecting the encryption keys can be used.

The memory security unit 20 also includes integrity tree generation and verification circuitry 36, referred to in general as verification circuitry 36 below. The verification circuitry 36 is responsible for maintaining the integrity tree 26 in the protected memory region. The integrity tree may provide a number of pieces of information for verifying whether data currently stored in the protected region 22 is still the same as when it was written to that region. The checking of data integrity can for example be achieved using message authentication codes (MACs) which may be generated from the stored data using one-way cryptographic functions such as AES-GCM or SHA-256, which use functions which make it computationally infeasible for an attacker to guess the authentication code associated with a particular data value by brute force when a secret key used to generate the authentication code is unknown. The authentication codes may be stored alongside the data 24 in the protected memory region 22 or in a separate data structure. The stored MAC for a data value is checked against a calculated MAC derived from the stored data using the same one-way function used to generate the stored MAC, and if a mismatch is detected between the stored MAC and calculated MAC then this may indicate that the data has been tampered with.

However, providing MACs alone may not be sufficient to prevent all attacks. Another type of attack may be a replay attack where a malicious person with physical access to the system stores a legitimate combination of the encrypted data and the MAC which was observed previously on the bus and then replays these onto the bus later with an intent to corrupt data at a given memory location with stale values so as to compromise the operation of the system. Such replay attacks can be prevented using the integrity tree 26, which may provide a tree structure of nodes where each leaf node of the tree provides integrity data for verifying that one of the blocks of data 24 in the protected memory region 22 is valid and a parent node of a leaf node provides further integrity data for checking that the leaf node itself is valid. Parent nodes may themselves be checked using further parent nodes of the tree, and this continues as the tree is traversed up to the root of the tree which may then provide the ultimate source of verification. Root verification data 38 stored in the on-chip memory 34 may be used to verify that the root of the tree is authentic, either by storing the root node of the tree itself on on-chip, or by storing other information which enables the root node stored in the protected memory region to be authenticated.

The memory security unit 20 may have address calculating circuitry 40 for calculating the addresses at which the nodes of the integrity tree 26 required for checking particular data blocks are located in the protected memory region 22. Optionally, the memory security unit 20 may also have a cache 42 for caching recently used nodes of the integrity tree for faster access than if they have to be read again from the off-chip memory 14. Alternatively, the memory security unit 20 could have access to one of the caches 10 which may also be used by the processor core 6 and so caching of data from the integrity tree 26 within the shared cache 10 could also help to speed up operation of the memory security unit 20.

Figure 2:
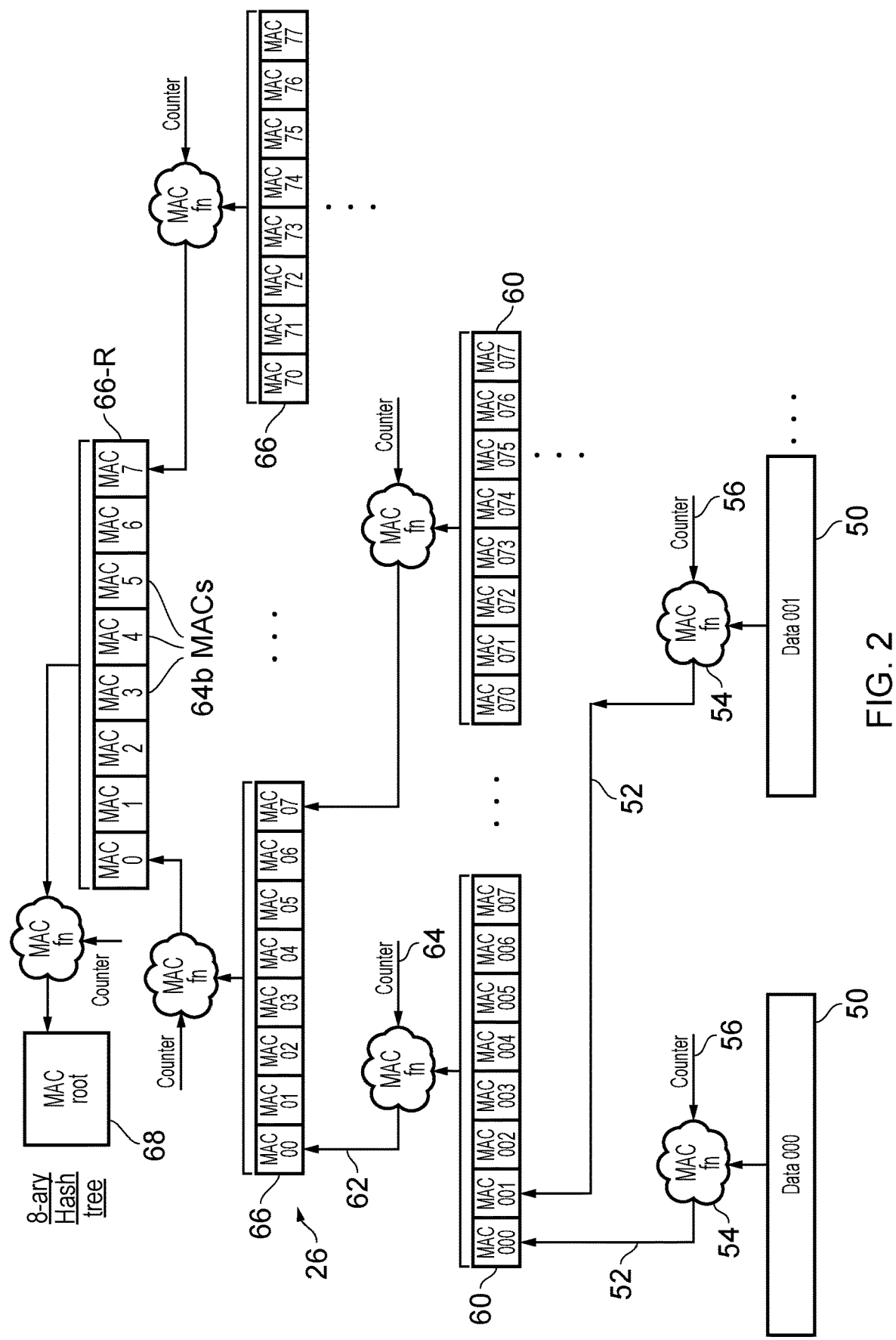
FIG. 2 shows for comparison an example using a hash tree to check the integrity of data stored in the protected memory region.

There are a number of ways in which the integrity tree can be implemented. FIG. 2 shows, for comparison, a first example which implements the integrity tree 26 as a hash tree built up from the hashes (MACs) for the respective data blocks. As shown in FIG. 2, each data block 50 has a corresponding MAC 52 calculated by applying the MAC hash function 54 to the contents of the data block 50. The MAC hash function 54 also depends on a counter 56 which is updated at each update to the data block, for providing freshness (variation in the way the MAC is derived from the data and a secret key) so that it is harder for an attacker to deduce the secret key. In this approach the counters 56 used for each MAC generation may be stored separate from the hash tree 26 in a separate data structure. The data blocks used to store the counters could themselves be some of the data blocks 50 protected using the MACs. Alternatively, the counters could be stored in the unprotected memory region 28, as tampering with a counter would still be detectable as it would cause the corresponding data block's MAC authentication to fail.

All of the MACs 52 calculated for a certain group of data blocks are gathered together within a leaf node 60 of the integrity tree 26, so that the leaf node specifies the MACs covering a certain range of the address space. The integrity of the leaf node 60 of the tree can then be protected by calculating a further MAC 62 based on the contents of the leaf node 60 and a further counter 64 to generate another MAC, which itself is stored together with MACs from other leaf nodes 60 within a non-leaf node 66 of the integrity tree 26. This non-leaf node 66 acts as a parent node of each of the leaf nodes 60 whose MACs are stored in the non-leaf node 66. Hence, each parent node stores MACs for protecting a block of memory equivalent in size to the total memory covered by all of the MACs stored in each of its children nodes. For example, in the case of FIG. 2 the tree is an 8-ary hash tree and so each parent node has eight child nodes and so covers a memory region eight times the size of the memory region covered by one of its children. Similarly, for each non-leaf node a further MAC is calculated by applying the same MAC calculation function to the non-leaf node, but using another counter specific to that non-leaf node. By continuing to group MACs of child nodes together in a parent node protected by a single MAC, eventually the entire protected memory region 22 can be reduced to a root node 66-R which stores the MACs for a number of child nodes which together cover the entire protected memory region 22. The number of levels of the tree required may depend on the size of the protected memory region. The authenticity of the root node 66-R can be verified either by storing the root node itself in the on-chip memory 34 as the root verification data 38, or as shown in FIG. 2 by computing a further MAC of the root node and storing that MAC 68 as the root verification data 38 in the on-chip memory 34.

Hence, when a data value has to be accessed, the corresponding data block 50 is subjected to the same MAC function 54 that was used to generate its MAC and the result is compared against the MAC stored in a corresponding leaf node 60 of the tree and then the tree is traversed with each successive child node being verified based on the MAC obtained from its parent node, until the root node is reached and the root node is also verified. If all of the verifications of each of the nodes on the branch leading from the target data block 50 back to the root node are successful, then the data access is allowed. Each counter 56 is incremented when the corresponding data block is updated (written to), so that the mapping between the data block and its MAC changes over time.

A problem with the approach shown in FIG. 2 is that to provide sufficient security that it is computationally infeasible for an attacker, given a particular data value but without knowledge of the secret key, to be able to guess the corresponding MAC or crack it by brute force, each MAC may need a reasonably large number of bits, for example 64 bits. This may limit how many MACs can fit in one cache line. For example, if the cache line size is 512 bits, then eight 64-bit MACs may fit within each cache line, and so each node of the tree is restricted to having eight child nodes. With an 8-ary hash tree, the number of levels of the tree which have to be traversed from the leaf node all the way up to the root may become relatively large as the size of the protected memory region increases. As each cache line which has to be accessed to verify a single data block 50 has not been tampered with will add to extra memory traffic between the off-chip memory 14 and memory controller 12, this can affect performance. Similarly, when data is updated within the off-chip memory then incrementing the counter at a leaf node can then require all the MACs at higher nodes which correspond to that block of memory to be updated, as each increment to a counter associated with one node would need the corresponding MAC in the parent node to be recomputed and updated, which would then trigger an increment to the counter associated with that node, thus requiring re-computation of the MAC stored in the next highest parent node, triggering a further increment to a counter, and so on until the root is reached. The lower the arity of the tree, the greater the number of levels that need to be traversed to protect a given size of memory region, and so the greater the impact on performance.

Figure 3:
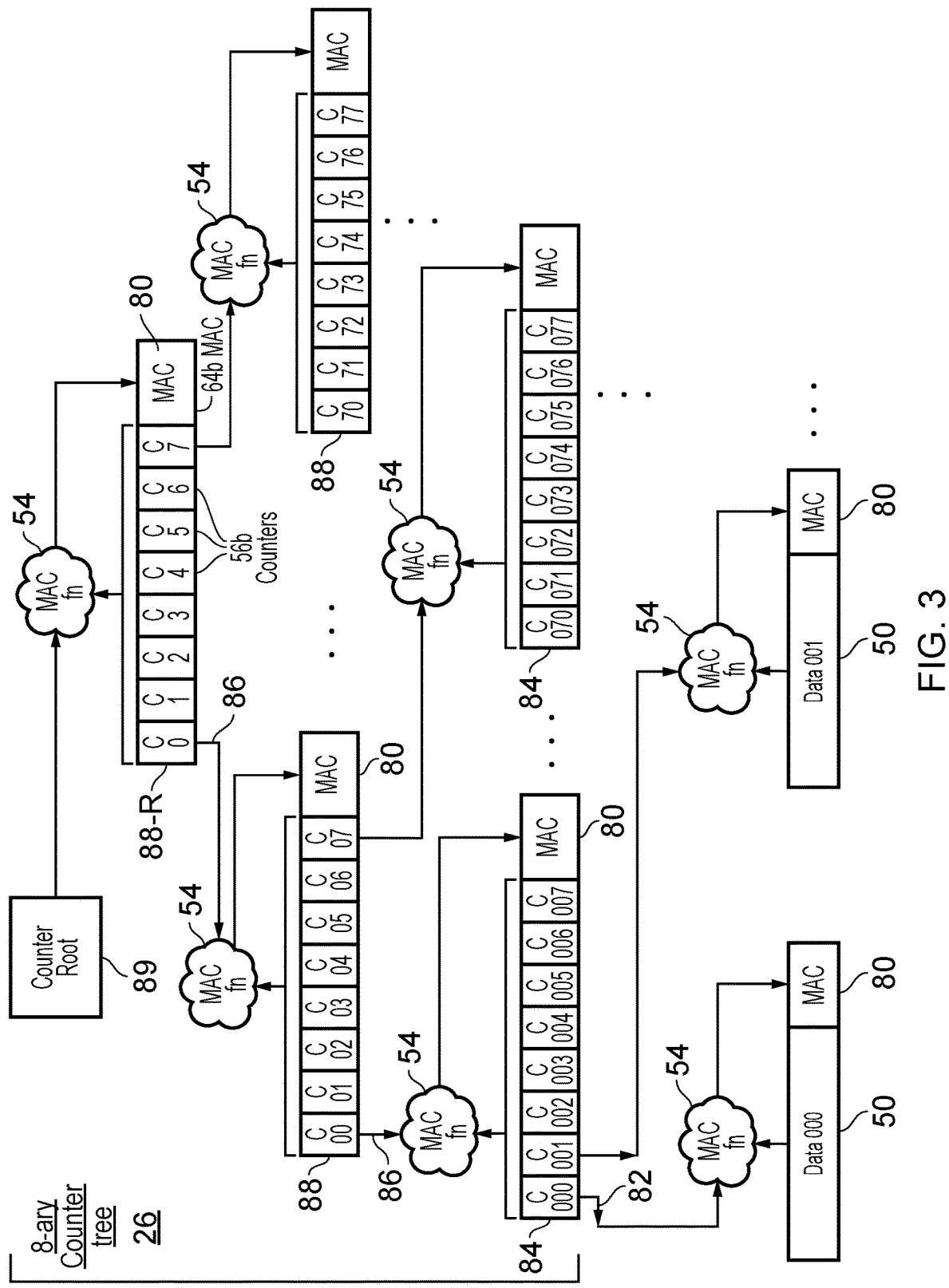
FIG. 3 shows for comparison an example of a counter integrity tree where each node of the tree specifies monolithic counters for checking the integrity of data.

FIG. 3 shows an alternative way of implementing the integrity tree 26 using a counter tree instead of a hash tree. In this case, rather than a given node of the tree providing all the MACs to be used for authenticating the blocks at a subsequent node of the tree, each node instead defines separate counters for each child node of the current node of the tree. Each data block 50 of the protected memory region 22 which is not part of the integrity tree 26 itself is protected by a MAC 80, which is computed based on the contents of the data block 50 and a counter 82 which is read from a leaf node 84 of the counter integrity tree 26. The leaf node 84 may specify a number of counters each corresponding to different data blocks 50. In this example the MAC 80 calculated for a given data block 50 is stored within the same cache line as the corresponding data. This is not essential, and in other examples, the MAC could be stored separately from the corresponding data. For each leaf node 84 of the tree a similar MAC 80 is computed based on the contents of the leaf node 84 and a counter 86 read from a non-leaf node 88 which acts as the parent node of the leaf node 84. Each non-leaf node 88 provides the counters used for multiple child nodes 84. Similarly, at each level of the tree, the counter 86 used to compute the MAC 80 for a given child node is read from a data block 88 corresponding to the parent node of that child node, all the way up to the root node 88-R. The address calculating circuitry 40 of the memory security unit 20 identifies, for a given target data block of interest which other data blocks store the required nodes of the integrity tree 26 providing the relevant counters. Eventually, the root node 88-R is reached and the MAC 80 for the root node is computed as a function of the contents of the root node and a root counter 89. The root counter 89 could be stored as the root verification data 38 in the on-chip memory 34. Alternatively, the entire root node 88-R of the tree could be stored in the root verification data in the on-chip memory and in this case there is no need to compute a further MAC for this root node.

In summary, with the counter tree shown in FIG. 3, at each level of the tree the counter cache line's integrity is ensured by using a MAC stored in the same cache line which is calculated using a counter read from a parent node of the tree.

Each counter is incremented or updated each time the corresponding data block is written to. For example, when a data block 50 providing non-integrity tree data is updated, then the corresponding counter within one of the leaf nodes 84 of the tree is incremented. This then requires re-computation of the MAC 80 associated with the leaf node 84, which triggers an increment of the counter in the next highest parent node 88 of the tree and so on all the way back up to the root.

When one of the counters overflows, for example wraps around from the most positive value of the counter to the most negative value or to zero, then one of the previous counter values may be repeated and so there is a risk that replay attacks could become possible. In this case, the memory security unit 20 may update the encryption keys used by the encryption circuitry 32 so that again this will force a different mapping between a particular data value seen in the clear and the MAC generated based on the encrypted data value and the counter. However, such updates to the encryption keys can be expensive, because when the encryption keys change, all of the data in the protected memory region 22 would need to be decrypted using the old keys and re-encrypted using the new keys and then written back to memory. This can be an expensive operation in terms of performance since it may require a large number of reads and writes. To reduce the frequency with which such complete re-encryption of the protected memory region 22 is required, it may be desirable to provide each data block with a counter with a sufficient number of bits to make such overflows rare. For example, in the approach shown in FIG. 3, each 512-bit cache line has 64 bits used for the MAC and this leaves 448 bits for the counters which can be divided into eight counters of 56 bits each. While reducing the size of each counter could allow more counters to fit in one cache line, this will result in more frequent overflows which may impact on performance. Hence, the approach shown in FIG. 3 also tends to limit the arity of the tree (an arity of 8 in the example of FIG. 3), which limits how fast the tree can fan out and increases the number of levels required to be traversed in order to have the overall tree cover a certain size of the protected memory region 22.

Figure 4:
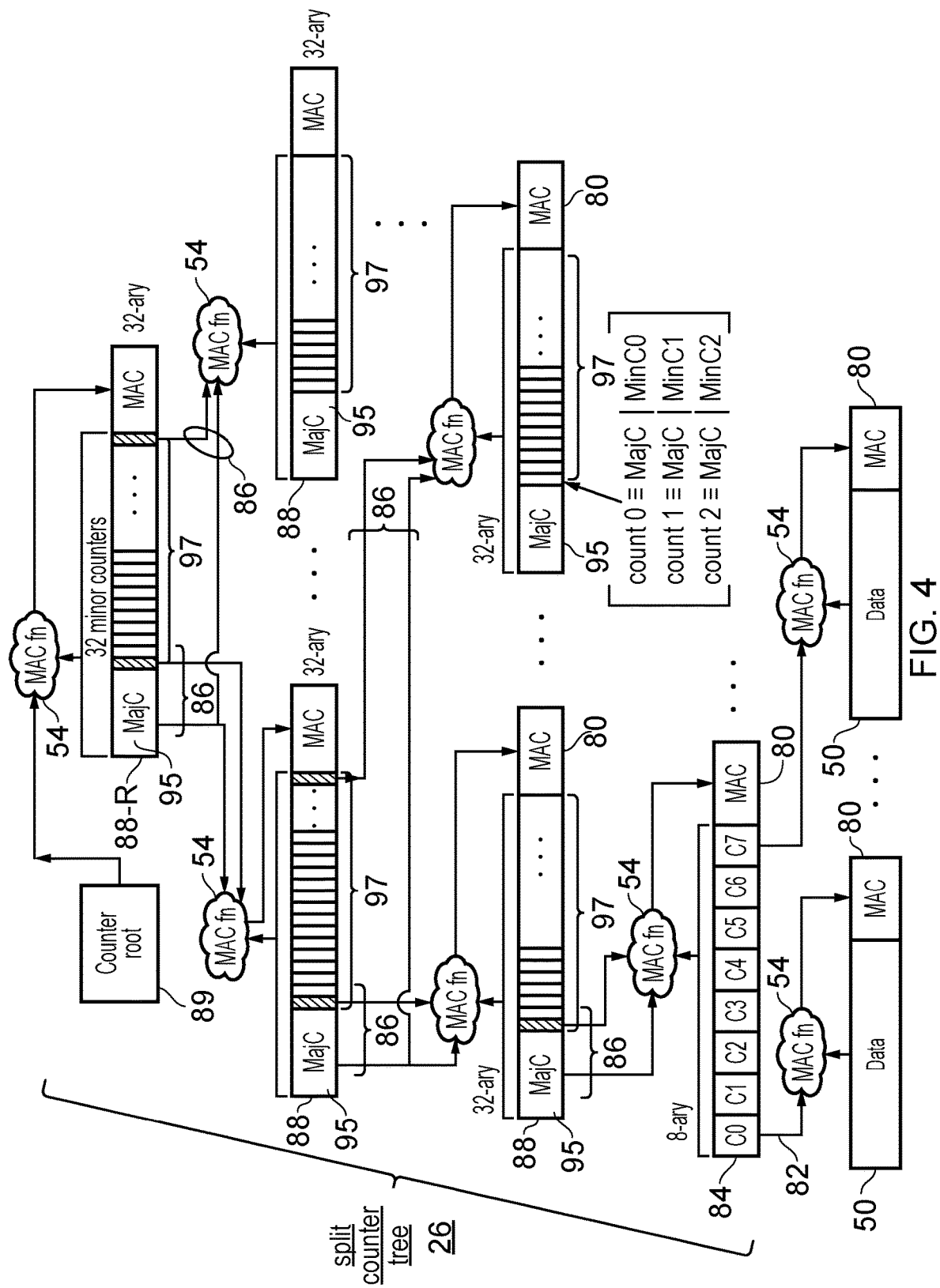
FIG. 4 shows an example of a counter integrity tree including split-counter nodes where counters are specified as the combination of a major count value shared between counters and respective minor count values specified separately for each counter.

FIG. 4 shows a split-counter integrity tree 26 which can be used by the memory security unit 20 to improve performance relative to the example shown in FIGS. 2 and 3. The counter tree has a similar arrangement of leaf nodes and non-leaf nodes 84, 88 as in FIG. 3 with each parent (non-leaf) node 88 providing the counters for computing the MACs 80 for each of its child nodes and the leaf nodes 84 providing the counters 82 for computing the MACs for other non-integrity tree related data blocks 50. However, in FIG. 4, at least some of the nodes of the tree use a split-counter approach, in which the counters in that node of the tree are represented in split-form using a major count value 95 and a number of minor count values 97. Each of the minor count values 97 corresponds to one of the data blocks covered by that node of the tree. The actual counter for a given data block is defined by the combination of the major count value 95 (which is shared between all of the blocks covered by that node) and the specific minor count value 97 specified for that data block. For example, the counter for block 0 could correspond to the major count value concatenated with the specific minor count value selected for block 0; the counter for block 1 can correspond to the shared major count value concatenated with the specific minor count value selected for block 1; and so on. Hence, when the MAC 80 is calculated for a given block of data, the MAC function 54 is applied to the contents of the data block together with both the shared major counter 95 from the parent node and one of the minor counters 97 selected for the particular data block. Each minor counter 97 is incremented on each update to the corresponding data block. The shared major counter 95 is incremented when any of the corresponding set of minor counters 97 overflows.

By using this split-counter approach, the overall size of counter provided for each data block can still be relatively large, while still having separate counters for each data block, to make it harder for attackers to guess the counter value applied to a given data block. For example, a 512-bit cache line using a 64-bit MAC could be provided with a 64-bit major counter and 32 12-bit minor counters, effectively providing a 76-bit counter for each data block. Hence, the chance of a counter overflow requiring re-encryption of the entire protected memory region can be reduced by providing a total number of bits of the major counter and one minor counter that is sufficiently large.

However, as the number of child nodes which can be covered by one parent node is dependent on the number of minor counters, and the minor counters in the approach shown in FIG. 4 are smaller than the monolithic counters shown in FIG. 3, this means that the arity of the tree can be greatly increased so as to permit, for any given size of cache line, a greater number of child nodes per parent node. In the example of FIG. 4, the arity is 32 for the split-counter nodes of the tree. This means that the fan out of the tree is much greater and so fewer levels are required in order to cover a given amount of memory. As shown with the leaf node 84 of FIG. 4, it is not essential for all the nodes of the tree to use the split-counter approach, for example some could still use the monolithic approach shown in FIG. 3 and so may have a different arity, e.g. eight for the example of FIG. 4. This may be useful if the overall size of the protected memory region does not map to a number of blocks corresponding to an exact power of the arity used in the split counter nodes, in which case some nodes of lower arity may be required.

Figure 5:
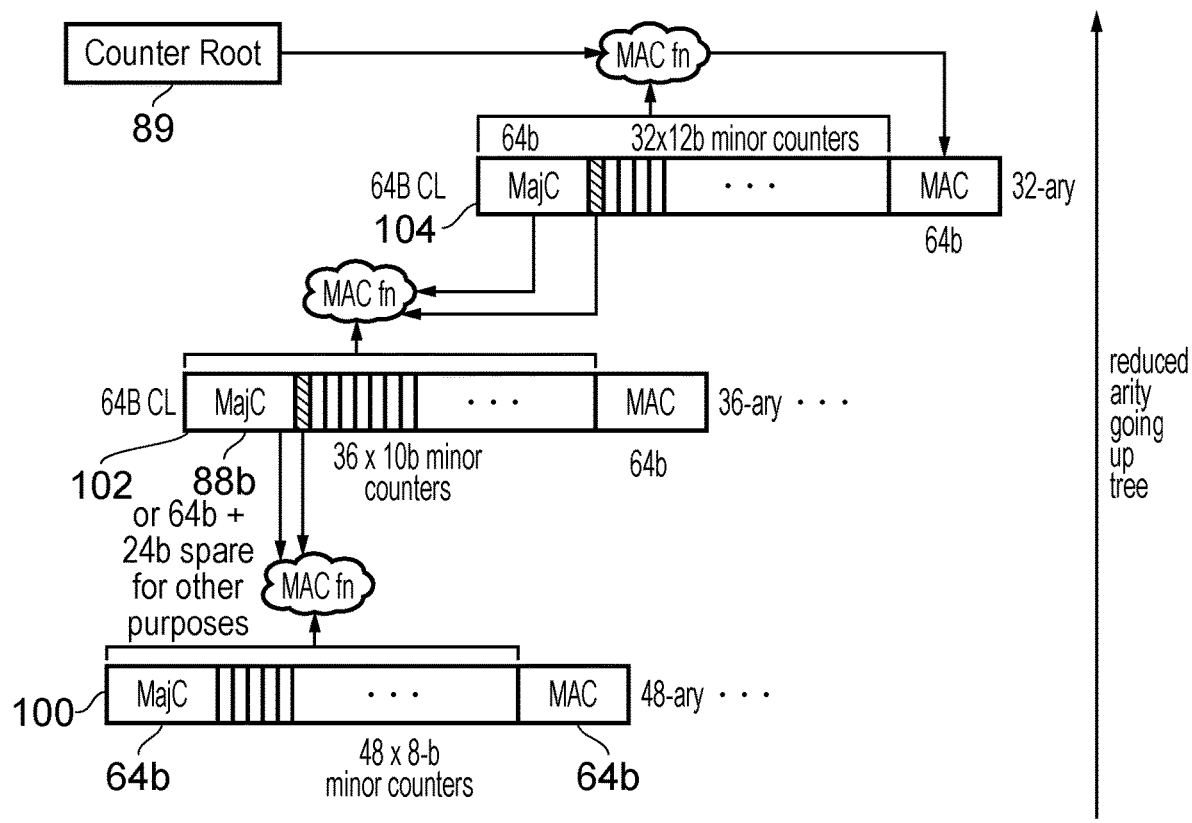
FIG. 5 shows an example where the arity of nodes of the counter integrity tree is reduced going up the tree towards the root node.

As shown in FIG. 5, the arity does not need to be the same for each split-counter node. In fact, it can be useful to reduce the arity as the tree is traversed up towards the root node. This is because as the tree is ascended towards the root node, the write traffic increases exponentially and so there is a greater chance of the counters overflowing. By implementing higher levels of the tree (closer to the root) with a lower arity than lower levels (closer to the leaves), this can provide better performance overall. For example, FIG. 5 shows examples with 48-ary nodes 100 in which 48 8-bit minor counters are provided, 36-ary parent nodes 102 in which 36 10-bit minor counters are provided, and a 32-ary grandparent node 104 having 32 12-bit minor counters. By increasing the size of the minor counters going up the tree, the number of times large regions of memory have to have their MACs re-computed because of a counter overflow can be reduced. Of course, the particular sizes of the major counter, the minor counters and the MAC shown in FIG. 5 are just one example and these sizes can be varied depending on the cache line size available and the requirements of a particular system.

As shown in FIG. 5, some of the nodes of the tree may have an arity which is not an exact power of two, e.g. the 36-ary or 48-ary nodes shown in FIG. 5. Although this may require more complex address calculating circuitry 40, e.g. a look up table instead of indexing based on a subset of address bits, using non-power of two arities can be useful as they may provide a better balance between the likelihood of overflows and the number of tree levels that need to be traversed on each read/write, so that they provide an overall performance improvement despite the more complex address generation.

Figure 6:
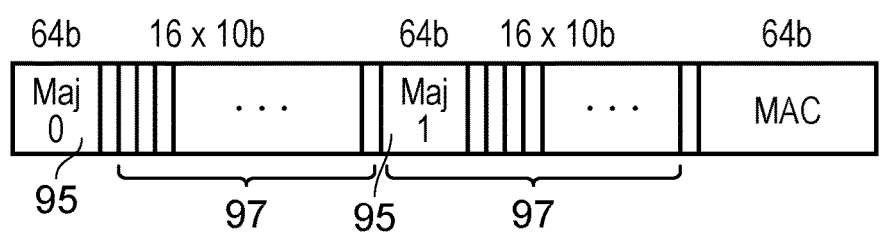
FIG. 6 shows an example in which one node of the counter integrity tree specifies more than one major count value, each major count value corresponding to a different subset of the minor count values specified by that node.

In the example of FIGS. 4 and 5, each split-counter node of the tree specifies a single major counter 95 which is shared amongst all the minor counters for all the child nodes of that node. However, as shown in FIG. 6 this is not essential and in some cases a given node of the tree could specify multiple major counter 95 each corresponding to a portion of the minor counters 97. While specifying additional major counters per node could reduce the number of minor counters which can be provided in a given size of cache line, in some cases this may be desired to reduce the overhead when a minor counter overflows because not as many data blocks sharing the same major counter will have to have their MACs re-computed when the major counter is incremented.

Figure 7:
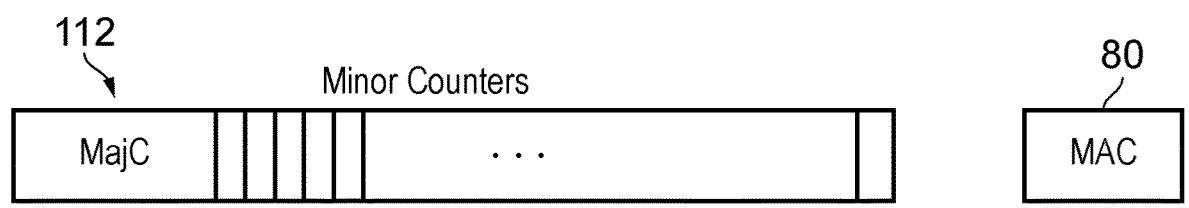
FIG. 7 shows an example in which a stored authentication code for a given data block is stored separate from that data block.

While the example in FIGS. 4 and 5 stores the MAC 80 associated with a data block in the same cache line as the data itself, as shown in FIG. 7 this is not essential and other implementations could store the MAC 80 in a separate cache line from the cache line 112 which provides the data block or integrity tree node being protected by the MAC. For example, the MAC 80 could be stored in an error correcting code (ECC) region of a memory chip which has a dedicated region for storing ECCs.

Figure 8:
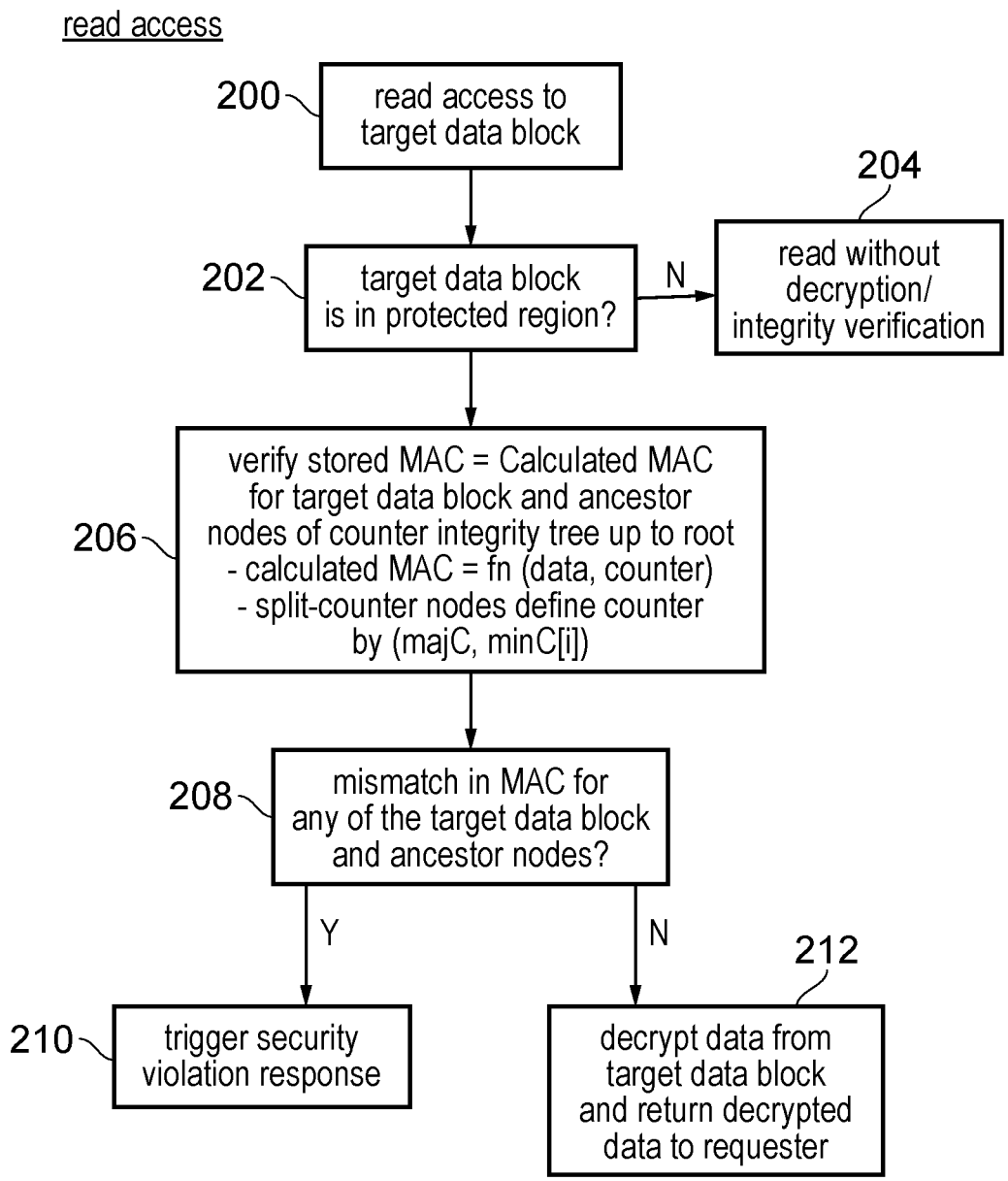
FIG. 8 is a flow diagram showing a method of controlling a read access to the memory.

FIG. 8 is a flow diagram showing a method of handling read accesses to request that data is read from the off-chip memory 14. Read accesses may be triggered by a load instruction executed by the processor core 6, or by cache prefetch requests initiated by a cache controller, for example. At step 200, a read access request is received by the memory controller 12. At step 202, the memory controller determines whether the target data block specified by the address of the read access request is mapped to the protected memory region 22. If the target address is mapped to the unprotected memory region 28, then at step 204 the read access is allowed to proceed without any integrity verification, independent of the integrity tree 26, and the data is read without performing any decryption. The data read from the off-chip memory is returned to the processor core and/or cache.

If the target address does map to a data block in the protected memory region 22, then at step 206 the verification circuitry 36 performs integrity verification for the data read from the target data block and one or more ancestor nodes of the counter integrity tree which are on the same branch as the target data block as the tree is traversed up to the root node of the tree 26. For each of the data blocks on the relevant integrity tree branch, the integrity tree verification circuitry 36 computes a calculated MAC which is a function of the data stored in the relevant data block and its corresponding counter as specified by a parent node of the tree. If the parent node is a split-counter node then its counter is defined by the combination of the shared major counter and a selected minor counter which is selected from the parent node depending on the position of the relevant data block within the block of memory covered by that parent node. The calculated MAC is compared against the stored MAC for the data block being checked, and at step 208 it is determined whether the stored MAC and the calculated MAC match for each of the target block and the one or more ancestor nodes of the counter integrity tree. If there is a mismatch between the stored and calculated MACs for any of the data blocks tested at step 206, then at step 210 a security violation response is triggered, such as trapping to an operating system to handle the security violation, or disabling access to the off-chip memory 14, or taking a physical counter measure such as fusing through electrical connections to prevent continued access to the memory. If no mismatch is detected for any of the tested blocks then at step 212 the data access is allowed and so the data read from the originally targeted data block is decrypted by the encryption/decryption circuitry 32 and then returned in decrypted form for use by the processor or one of the caches.

The verification at step 206 may therefore require a series of verifications of different data blocks in the protected memory region in order to check each step of the integrity tree. The reads required for such verifications can be triggered in any order, and similarly the corresponding verification calculations for computing the expected MACs for each of the read data blocks and comparing them against stored MACs can be done in any order. While in some embodiments the read for the original target data block may then trigger a read of another data block to obtain the target counter for that target data block, and then this read itself may trigger a further read, so that the reads do actually take place in sequence starting from the target data block and successively triggering further reads for each higher level of the tree up to the root node, this is not essential. In other examples on being presented with the read target address identifying the target data block as specified by the read access request, the address calculating circuitry 40 may map the read target address to the addresses for each node of the integrity tree required for verifying the integrity of the target data block, and so a number of parallel reads could be issued or some of the reads of the tree could be triggered in a different order to the sequence of the tree node ancestry. Hence, on a read access, the order in which each of the required verifications in the tree are carried out does not matter.

Figure 9:
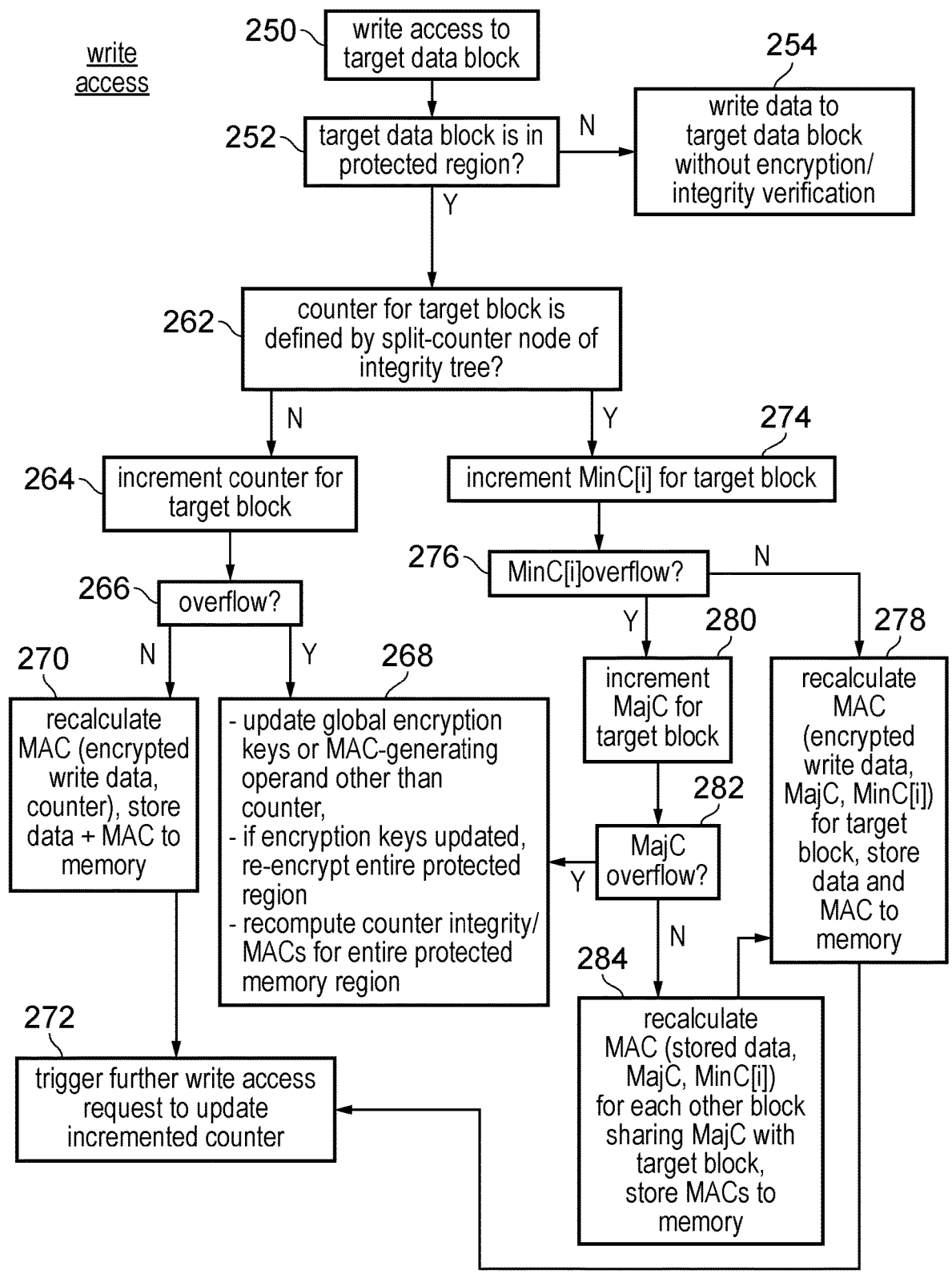
FIG. 9 is a flow diagram showing a method of performing a write access to the memory.

FIG. 9 shows a flow diagram showing a method of controlling write accesses to the off-chip memory 14 by the memory controller 12 and the memory security unit 20. At step 250 the memory controller 12 detects a write access which specifies an address which has been mapped to off-chip memory 14. The write access could be triggered by a store instruction executed by the processor core 6, or by a cache writeback triggered by a cache controller, for example. At step 252 the memory controller determines whether the address specified by the write access request identifies a target data block which is in the protected memory region 22. If not, then again no protection provided by the memory security unit 20 is needed, and so at step 254 write data is written to the target data block without any encryption being applied, and without any integrity verification being performed. Also, no modification to the integrity tree 26 is needed.

If at step 252 the target data block is found to be in the protected region 22, then at step 262, the integrity tree generation circuitry 36 determines whether the counter associated with the target data block subjected to the write access by the write access request is defined by a split-counter node of the integrity tree 26. If not, then at step 264 a monolithic counter associated with a target block is incremented. The increment could correspond to adding one to the current value of the counter, or could correspond to switching the count value from its current value to the next value in some known sequence which is to be taken by each counter. At step 266, it is determined by the integrity tree generation circuitry 36 whether the increment to the counter has caused an overflow, in which the counter has wrapped back to a previously used value. If an overflow occurred, then this means that all the possible count values which can be provided for a target block have been used since the last time that parameters affecting the global encryption or MAC calculation for the entire protected memory region 22 were updated. Hence, at step 268 any global encryption keys or MAC-generating operands which are used for every data block of the protected memory region 22 are updated. As the encryption keys are updated, then this means that all the data in the protected memory region 22 has to be read out, decrypted by the encryption/decryption logic 32 and then re-encrypted with the new keys and written back to the protected memory region 22. If the keys have remained the same but a MAC-generating operand other than the counter was updated then this re-encryption is not needed. Regardless of whether re-encryption is performed, the counter integrity tree and the MACs have to be re-computed for the entire protected memory region because the function used to generate the MACs will have changed or the encrypted data which is to be used for calculating the MACs has changed. Hence, the operations at step 268 are relatively expensive in terms of performance, but with a counter of sufficient numbers of bits these events can be rare.

If no overflow occurred at step 266 then it is not necessary to re-compute the MACs and counters for the entire protected region. Instead at step 270 the MAC corresponding to the target data block is re-calculated based on the new encrypted version of the write data which was specified in the write data access, and based on the incremented monolithic counter resulting from step 264, and then the re-calculated MAC is stored to the protected region 22, for example in the same cache line as the data itself. As the counter has been updated at step 264, the updated count value will need to be written to a leaf node or a parent node at a higher level of the tree and so at step 272 a further write access is triggered specifying the address of that higher node and specifying the updated value of the counter to be written. Hence, this may trigger a further instance of performing the method of FIG. 9 for that further write access.

On the other hand, if at step 262 the counter for the target data block specified by the original write access was determined to be defined by a split-counter node of the integrity tree, then the method proceeds to step 274. At step 274 the integrity tree generation circuitry 36 increments the minor counter which has been selected corresponding to the target data block. This is the specific minor counter which is dedicated to the target block being written to by the original write request. At step 276 it is determined whether the minor counter has overflowed due to this increment. If not, then at step 278 the MAC for the target data block is re-calculated based on the encrypted write data of the original write request, the shared major counter which is shared between the target block and all the other blocks which use the same major counter, and the incremented version of the specific minor counter selected at step 274, and the resulting MAC is stored to the memory in association with the encrypted write data.

If at step 276 an overflow of the minor counter occurs, then at step 280 the shared major counter in the parent node of the target block is incremented. At step 282 it is determined whether the major counter has overflowed. If not, then at step 284 the MACs are re-calculated for each other block which shares the major counter with the target data block and the re-calculated MACs are stored to memory for each of those blocks. Each MAC for the other blocks is calculated based on the current data stored in those blocks (read out from memory for the purpose of recalculating the MACs), and the incremented major counter and the specific minor counter for each of those other blocks. That is, each other block uses a different one of the minor counters but the same incremented major counter. If the node having the overflowed minor counter is a leaf node of the integrity tree, then the data associated with each of the other blocks whose MACs were recalculated is re-encrypted with a new counter before recalculating the MACs. If the parent node is a non-leaf node then it is not necessary to re-encrypt the data in the other blocks. After step 284, step 278 is performed in the same way as discussed above to re-calculate the MAC for the target block based on the new encrypted write data for the target block, the incremented shared major counter, and the incremented minor counter specific to the target block. Regardless of whether step 284 was performed or not, following step 278 the method proceeds again to step 272 in which further write access request is triggered to update the incremented counter resulting from steps 274 or 280. On the other hand, if at step 282 the major counter overflowed, then the situation is similar to at step 266 and so again at step 268 a global update operation is performed to update the encryption keys or MAC generating operand and then re-encryption of the protected memory region 22 is performed if necessary and the integrity tree 26 is completely re-computed for the newly updated parameters. The method of FIG. 9 is terminated once the MAC for the root node has been updated and the root node counter 89 has been incremented.

Although FIG. 9 for ease of understanding shows separate writes to write the recomputed MACs and the incremented counters to memory at steps 270/278/284 and 272 respectively, in embodiments in which the MAC for a given parent node is stored in the same cache line as the counters associated with that parent node's child nodes, then the MAC and counter updates may be buffered within the memory security unit 20 until all the required updates to a single cache line are ready, so that only a single write request is needed to write the updated cache line to the off-chip. Similarly, if there are multiple write requests to different non-integrity tree target data blocks 50 being performed in parallel, some of the counter updates for different target data blocks 50 could require different counters in the same integrity tree node to be updated, so by buffering up counter updates within the memory system unit 20 could allow such multiple counter updates in one cache line to be performed in a single write transaction to off-chip memory 14. Hence, it will be appreciated that the precise manner in which transactions are initiated to the off-chip memory 14 in order to perform the counter and MAC updates may vary from implementation to implementation.

It may be desirable to make the minor counters 97 of a given node as small as possible, as this allows a reduction in the number of levels in the Counter-tree for protecting the same area of memory, leading to less memory traffic during tree traversal and subsequent improvement in performance. Additionally, a larger number of minor counters per counter-cacheline leads to better cacheability and reduces the number of memory accesses to fetch the counters during tree traversal (since the traversal continues only until a hit in a cache).

On the flip side, a minor counter overflow in a leaf node implies re-encryption and re-computation of MAC's and for all the cache-lines residing in memory that are encrypted and authenticated using the major counter that was incremented due to the overflow. Since the integrity tree itself may be stored in unencrypted format, a minor counter overflow in a non-leaf node will only incur MAC re-computation overheads. However, a parent node minor counter is incremented on a write to any of the minor counters in the child node, so as you go up in the tree, the number of writes can increase leading to more overheads. Thus, the small footprint and better cacheability characteristics afforded by small minor-counters are viable to cut down the memory traffic overheads for integrity protection only if the re-encryption and MAC re-computation overheads can be managed. If the minor counter size is fixed for a given node, it is difficult to reconcile these competing demands.

To this end we propose a mechanism to vary the size of minor counters without impacting the arity of the tree. This is illustrated in FIGS. 10 to 13. For cache-lines that tend to be written frequently to memory, the minor counter size is increased dynamically without impacting the arity of the tree. The high-arity compact tree provides the benefits of fewer memory accesses for integrity protections, and the larger minor counters for just the frequently written cache-lines will help check the re-encryption and MAC re-computation overheads. In order to achieve this behaviour we steal a small number of bits from the MAC in a counter cache counter cache line, which are used to indicate the size of the minor counters. The minimum value (00) of these bits can be used to indicate the smallest minor counter size (3 bits in the example of FIGS. 10-13).

Figure 10:
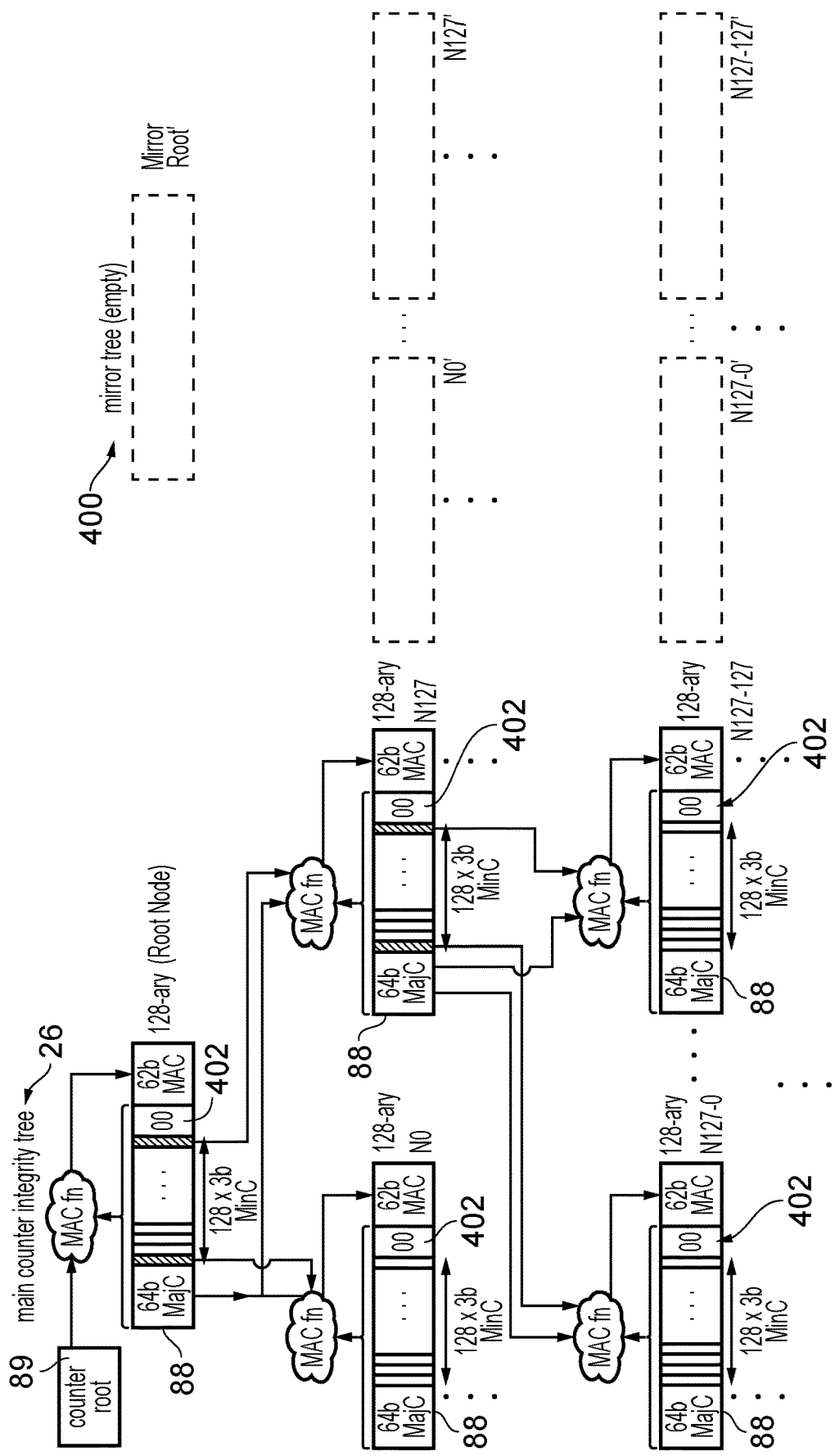
FIGS. 10 and 11 illustrate an example of increasing the size of minor counters of a split-counter node by allocating space for a subset of the minor counters in a corresponding node of a sparsely populated mirror counter integrity tree.

As shown in FIG. 10, the memory security unit 20 begins by constructing a main counter tree 26 where all the counters are of the smallest size (e.g. 3 bits). The size of the minor counters in each node is indicated in the size field 402, which in this example is 2 bits made available by reducing the size of the MAC to 62 bits instead of 64 bits. An alternative would be to reduce the size of the major counter instead of reducing the size of the MAC, in order to make room for the size field 402. At this point the mirror tree 400 that will accommodate additional mirror nodes if it is necessary to increase the minor counter size may not exist yet—the mirror tree 400 can be allocated when required as discussed below. Alternatively, space for the mirror tree 400 could already have been allocated in memory, but the mirror tree 400 may not be populated yet.

The main counter tree 26 is used in the same way as the embodiments discussed above, to verify integrity of a given data block by comparing its associated MAC with a MAC computed based on the contents of the data block, and a major counter and minor counter taken from the parent node associated with that data block. Multiple integrity checks of each node traversing up the tree can be made up to the root, to check that each counter is itself valid. Root verification information 89 for verifying integrity of the root node may be stored in on-chip memory as discussed above. On a write to a data block the relevant leaf node counter is incremented, and that node's MAC recalculated.

This continues until a size increase trigger event is detected which indicates that it may be useful to increase the size of the minor counters of a given node 88 of the main tree. A variety of events could be treated as a size increase trigger event. For example, the size increase trigger event could be a detected overflow of a minor counter in the given node. Also, the size increase trigger event could be a rate of overflows of minor counters of the given node exceeding a threshold, or the rate of overflows meeting some other condition. Also, in general, a metric concerning the frequency or pattern of overflows, re-encryptions or MAC re-computations detected for a given tree node could be monitored, and used to determine whether to increase the size of the minor counters. In another example, the size increase trigger event could comprise detecting that a level of memory traffic associated with an associated subset of the protected region is greater than a threshold, where the associated subset of the protected region comprises a portion of the protected region for which verifying integrity of any target block within the associated subset is dependent on the given split-counter node. For example, the memory security unit 20 could monitor a volume of memory traffic associated with particular portions of the protected region. Nodes at higher levels of the tree (closer to the root) will typically be associated with a larger portion of the protected region than nodes at lower levels because their counters are involved in checking the integrity of a greater number of data blocks (due to the sequence of MAC computations needed to verify each successive counter traversed through the tree). Hence, if there is a large volume of traffic to the portion whose integrity is verified depending on a given node of the tree, the corresponding node could have its minor counter size increased. For example, the monitoring of memory traffic could be based on tracking the number of writes from the last level cache 10 of the processor core 6 to the off-chip memory 14, or based on tracking the number of writes by the memory security unit 20 from its own internal cache 42 to the off-chip memory 14.

Hence, in general the memory security unit 20 may identify a size increase trigger event which indicates that the minor counters in a given node of the main tree 26 are too small. When a need to grow the size of a minor counter is identified, the memory security unit 20 allocates one or more mirror subtree(s) 400 of equal size to the main tree 26. The minor counter size for all minor counters in the identified node of the main tree is increased to an integral multiple of the smallest size (e.g. 6 bits in FIG. 11) and only a fraction f of the minor counters of that node are stored in the original location (e.g. f=0.5 in FIG. 11). The rest of the minor counters of that node are allocated to a corresponding node of the mirror tree 400, which is located at the same offset within the mirror tree 400 as the offset used for the main node in the main tree. The size field 402 of the main node is updated to indicate that a subset of the minor counters of that node are actually stored in the corresponding mirror node 404 of the mirror tree 400.

Figure 11:
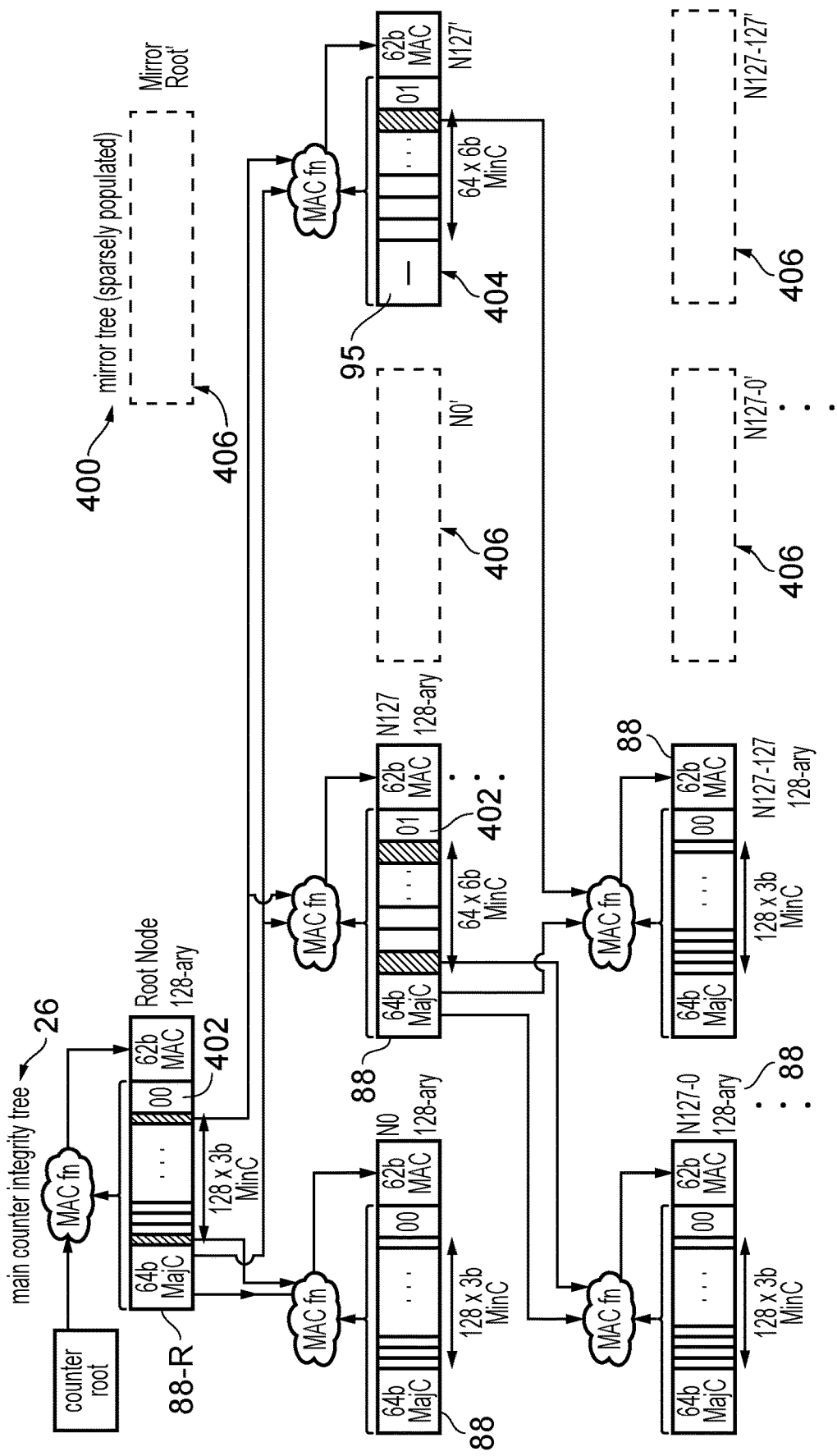

FIG. 11 shows an example where node N127 of the main tree needs larger minor counters. Hence, the minor counters are increased to 6-bit counters, which means there is only space for storing 64 of the 128 minor counters associated with the 128 child nodes N127_0 to N127_127 of node N127. Hence, the size field value 0b01 in field 402 of node N127 identifies that minor counters 0-63 are stored in that node itself, but minor counters 64-127 are stored in the corresponding mirror node N127' in the mirror tree 400.

When increasing the size of the minor counters of a given main tree node using a newly allocated node in a mirror tree, the memory security unit 20 may perform the following steps:
1. roll back the minor counter that just overflowed, to its value before the overflow.
2. where the minor counter has M bits before the size increase and N bits after the size increase, for each N-bit minor counter in the main node and at least one mirror node:
   set the M least significant bits of the minor counter equal to the value of the corresponding minor counter prior to the overflow;
   set the (N−M) most significant bits of the minor counter equal to the (N−M) least significant bits of the major counter of the given main tree node.
3. right shift the major counter of the given main tree node by (N−M) bits (so that the bits shifted to the minor counters have been shifted out and (N−M) leading 0s prefix the remaining bits of the major counter).
4. Then increment the minor counter that overflowed again.

For example: let us consider a node that has a 4 bit major counter and 4 2-bit minor counters (using smaller counter sizes for simplicity). Further let us assume that the counters have following (binary) values:

| Major C. | Minor C's |
|---|---|
| 0101 | 01 10 11 00 |

If now a size increase event causes the minor counter to grow to 4 bits (because the 4th minor counter just overflowed from 11→00) then the updated main tree node and mirror nodes would look as follows:

| Main tree node: | | Mirror tree node: | |
|---|---|---|---|
| Major C. | Minor C's | Major C. | Minor C's |
| 0001 | 0101 0110 | 0001 | 0111 1000 |

Here N=4, M=2, so (N−M)=2 i.e. we added 2 additional bits to all minor counters. So we prefix all minor counters with 2 lsb bits of the major counter and prefix the major counter with 2 0's.

Such an operation ensures that the combination of Major-Counter:Minor Counter remains unchanged for all other (non-overflowed) minor counters in the affected node, and thus costly re-encryptions/MAC-re-computations are avoided.

Hence, when authenticating the MAC of a child node N127_0 of node N127, the minor counter may be selected from the parent node N127 itself, but when authenticating the MAC of a different child node N127_127 of node N127, the minor counter may be read from the mirror node 127'. Both the main node N127 and the mirror node N127' share the same parent node in the main tree, and so the same major and minor counters (taken from the root node in this example) are used to calculate the MACs associated with both the main and mirror nodes N127, N127'. Although each mirror node 404 may have the same layout as nodes 88 of the main tree, the major counter field 95 need not be used in the mirror nodes 404, as the major counter 95 shared between all minor counters in the mirror node 404 and the corresponding main node 88 may be specified in the main node 88 itself.

For the other nodes (root node, N0, N127_0, N127_127) shown in FIG. 11, there has not yet been any need to increase the size of the minor counters, so the corresponding locations 406 in the mirror tree are not yet populated. The mirror tree 400 is a sparsely populated structure, for which space in memory has been allocated to accommodate a complete tree of the same size as the main tree 26, but only selected nodes of the mirror tree 400 are filled, depending on which nodes 88 of the main tree have the most memory traffic and so are determined to need additional bits for each minor counter to reduce the frequency of overflows. Hence, there is no need to unnecessarily allocate minor counters of greater size than necessary, so that the arity of each node can be as high as possible, but for those frequently accessed regions of memory the corresponding nodes can be given larger counters without sacrificing arity, to reduce the costly performance overhead of having to re-encrypt data or recompute MACs as often. If the root node 402 of the main tree is allocated a mirror node in the mirror tree 400, then the root integrity verifying information 89 in the on-chip memory may also specify information for verifying integrity of the root node of the mirror tree 400. If the root node 402 of the main tree does not require a mirror node, then any node of the mirror tree 400 can have its integrity verified based on information specified in a parent node of the main tree 26 or in a mirror node 404 corresponding to that parent node if the parent node has expanded minor counters.

Figure 12:
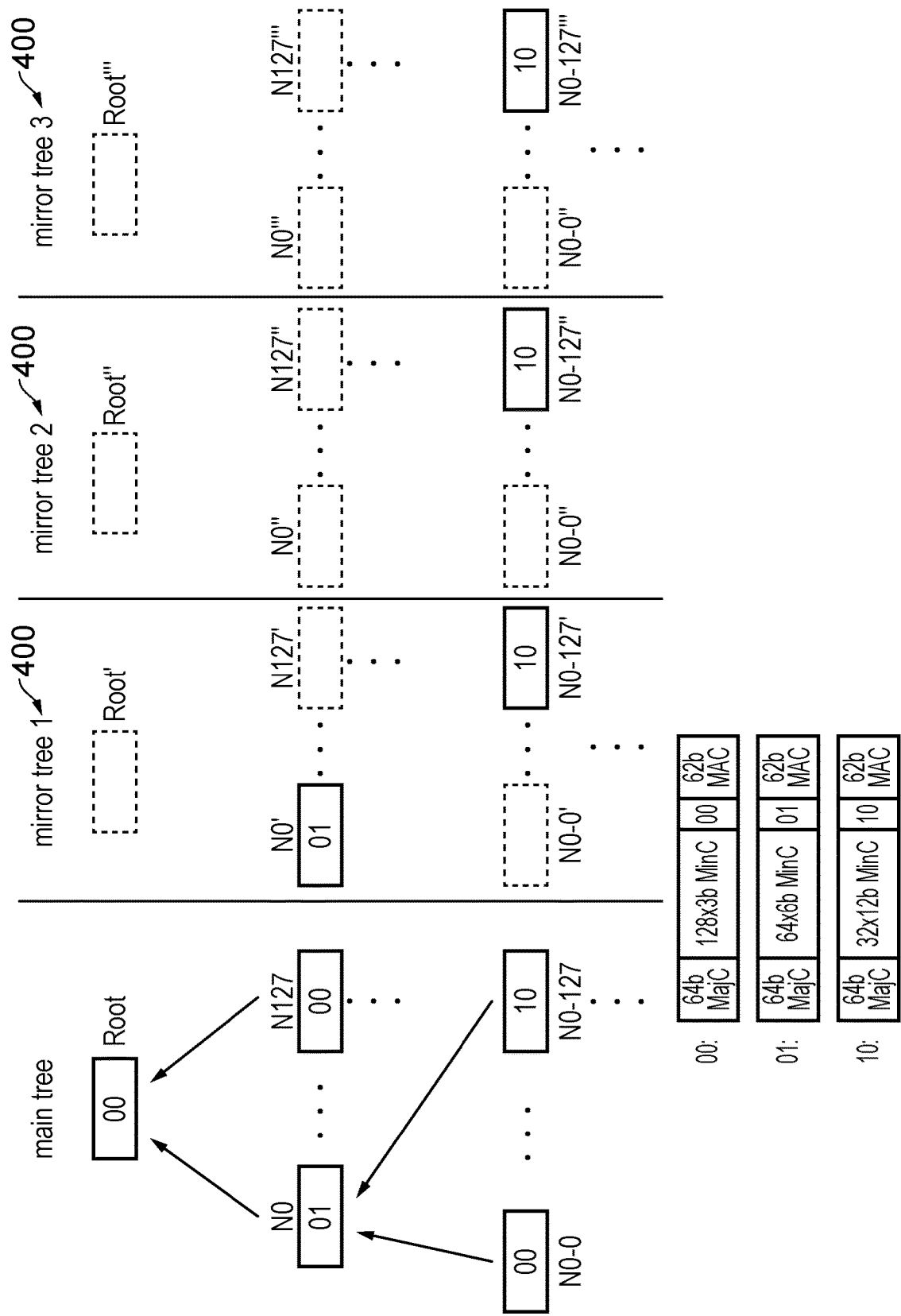
FIG. 12 illustrates an example where more than one mirror counter integrity tree is used.

As shown in FIG. 12, in some cases multiple levels of minor counter size may be supported, so each time the size increase triggering event is detected for a given node of the main tree, the minor counter size could be increased to the next largest size supported by the memory security unit 20. For example, in FIG. 12 there are three levels supported: counter size fields 0b00, 0b01 and 0b10 indicating a counter size of 3 bits, 6 bits or 12 bits respectively. For nodes of the main tree where the minor counter size is more than double the minimum counter size supported, then additional mirror nodes in more than one mirror tree may be needed to accommodate all of the minor counters for the child nodes of that node. For example, for node N0_127 in FIG. 12, the size field value 0b10 indicates that 12-bit minor counters are used, so that only 32 12-bit minor counters fit within the space previously allocated for 128 3-bit minor counters. Hence, the remaining 96 12-bit minor counters for the child nodes of node N0_127 may be spread across three corresponding nodes N0_127', N0_127", N0_127''' in three further mirror trees 400 as shown in FIG. 12. In contrast, for node N0 of FIG. 12 where 6-bit minor counters are used, only one corresponding node N0' has to be allocated in the first mirror tree 400, which is enough to store the 128 minor counters needed, and so the corresponding nodes N0", N0''' in mirror trees 2 and 3 are not populated. If at a later time another size increase trigger event occurs for node N0 then the minor counter size could be incremented to 12 bits and at this point nodes N0" and N0''' may become populated. Each additional mirror counter integrity tree may have space allocated for it in memory the first time any node requires one of its mirror nodes to be populated (e.g. mirror trees 2 and 3 in FIG. 12 may have been allocated at the time when the minor counter size for node N0_127 of the main tree was increased to 12 bits).

Figure 13:
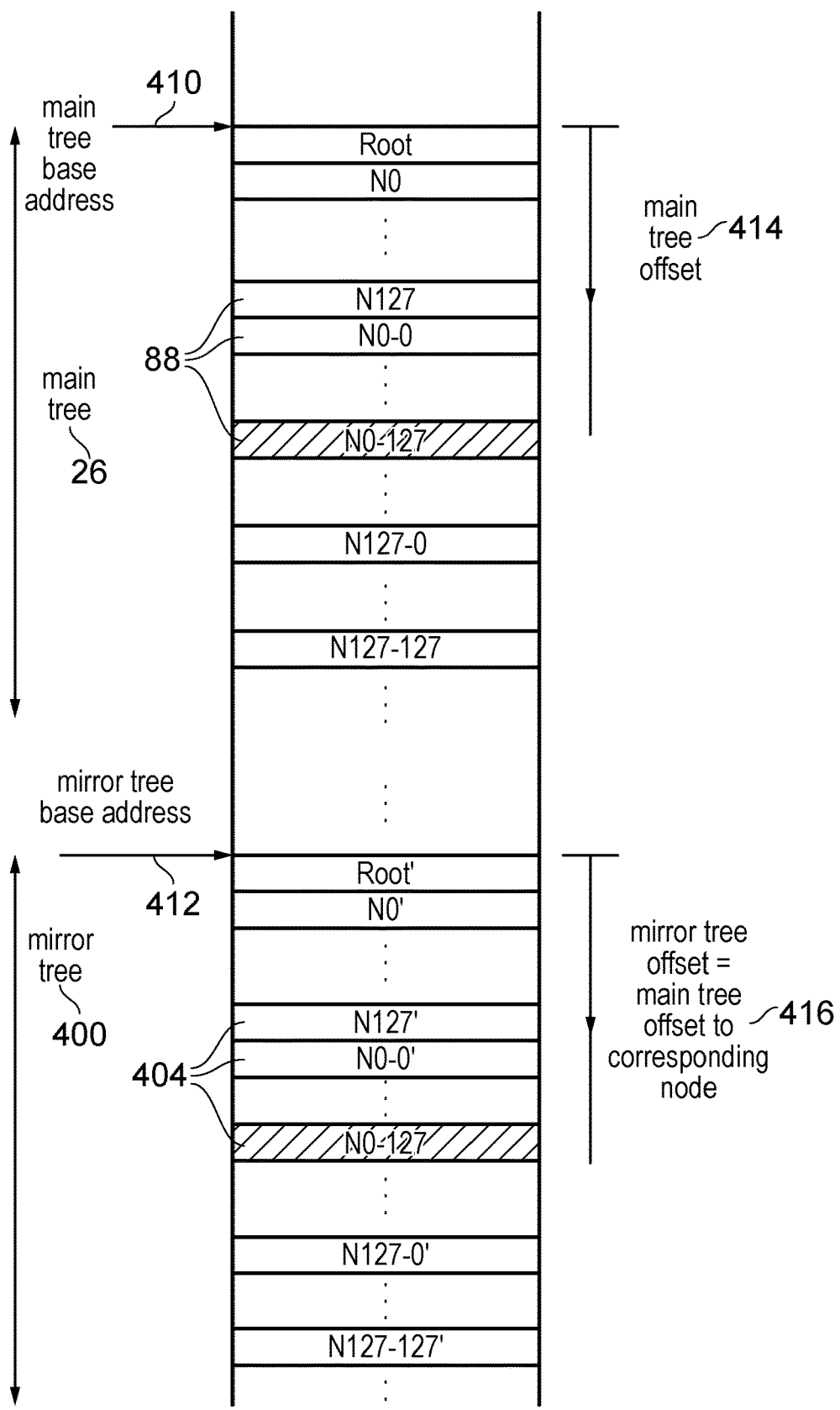
FIG. 13 shows using the same address offsets relative to a base address for corresponding nodes of the main and mirror counter integrity trees.

As shown in FIG. 13, the memory security unit 20 may allocate space in memory for the main tree 26 and one or more mirror trees 400. For the main tree 26, each node 88 of the tree is allocated a corresponding offset relative to a main tree base address 410. For each mirror tree 400, the memory security unit 20 may allocate the same amount of space as is allocated for the main tree 26, and each mirror node 404 of the mirror tree is located at the same offset relative to the mirror tree base address 412 as the offset used for the corresponding main node 88 in the main tree 26. For example, as shown in FIG. 13 the main offset 414 between the main tree base address 410 and the address of main node N0_127 is equal to the mirror tree offset 416 between the mirror tree base address 412 and the address of the corresponding mirror node N0_127'. The actual memory location at the offset specified by mirror tree offset 416 may not actually have been filled with any counters, depending on whether any need to expand the counter size of main node N0_127 has yet been identified. Hence, the space allocated for the mirror tree 400 in memory may be sparsely populated and some portions of this space may be unused at a given time.

For example, if we consider a system with a 1 GB protected region of secure memory to be protected by the integrity tree, the total memory required to store nodes covering that protected region when using 128 3-bit minor counters in each main tree node may be approximately 8 MB (when using the size of the major counter, size and MAC fields shown in the example of FIG. 10—clearly other sizes would also be possible). Hence, the size of the base tree may be around 8 MB. We build sparsely populated mirror sub trees of the same size (8 MB) for every jump in the minor counter size. Hence, even if 3 further mirror trees are built as shown in FIG. 12, the total space is still around 32 MB. In comparison the approach in FIG. 3 using fixed size counters would build a static counter tree with a footprint of approximately 150 MB. Hence, the overhead associated with building additional mirror trees in the approach of FIG. 10 is much lower. As memory is not written to with an even distribution in write frequency, protection of some regions can be accommodated with smaller minor counters, and the mirror trees can be used to boost the minor counter size for selected nodes without needing to sacrifice arity per node. Also, the variable minor counter size approach using mirror trees means the arity of each tree node can be greater for a given maximum minor counter size supported (e.g. 128 instead of 32), reducing the total number of nodes needed for protecting a given size region of memory, and hence less space is needed for storing MACs or major counters even if all nodes end up with their minor counter size increased to the maximum size. This means that even if all nodes of the tree shown in FIG. 10 were increased to 12-bit minor counters and required all 3 mirror trees to be fully populated, the total space would still be lower than FIG. 3.

The base addresses 410, 412 of the main tree 26 and each mirror tree 400 may be retained within the memory security unit 20, either within its cache 42 or within dedicated base address registers. If base address registers are provided, each mirror tree base address register may be set to an invalid value when no corresponding mirror tree has yet been allocated (e.g. the invalid value could be a predetermined base address which is not allowed to be allocated for a real mirror tree, e.g. all 0s or all 1s, or a separate valid bit associated with the register could indicate whether the address is a valid base address). In this case, then the memory security unit 20 may be able to deduce the maximum size of minor counter used throughout the tree structure from whether or not a particular mirror tree base address is valid. For example, if the base address register associated with the mirror tree 2 of FIG. 12 is indicated as invalid, then this would indicate that the maximum minor counter size used in any node of the tree structure is 6 bits or less. This can avoid needing to store a separate indication of the maximum minor counter size used in the tree.

Also, the memory security unit 20 may in some examples maintain tracking information which is indicative of which nodes, and/or how many nodes, have been populated within a particular mirror tree. This can enable the memory security unit 20 to make decisions on whether to speculatively load a required mirror tree node when a corresponding node of the main tree 26 is required. That is, the memory security unit 20 may, on issuing a load request to access a main tree node, need to decide whether to: (i) wait for the main tree node to be returned, and then determine based on the size field 402 of the main tree node whether it is necessary to load a corresponding mirror tree node to obtain the relevant minor counter, or (ii) load one or more mirror tree nodes as well the main tree node, without waiting for the size field 402 of the main tree node to be checked to determine whether the mirror tree node is actually required. With option (i), memory bandwidth can be reduced by avoiding triggering unnecessary loads when the mirror tree node is not actually needed. With option (ii), performance can be improved by avoiding a delay in cases when the mirror tree node is required. Whether or not option (i) or option (ii) is preferred may depend on how many valid nodes have been established for a given mirror tree—the larger the number of valid nodes in a mirror tree, the greater chance the current access may require the corresponding mirror node, so the more likely a performance improvement may be available from speculatively loading a mirror node.

Hence, in general when accessing a given node of the main counter integrity tree, the memory security unit 20 could predict a minor counter size of the given node before the given node of the main tree has actually been returned from memory, and use the prediction of the minor counter size to determine whether or not to trigger a load of a mirror tree node in a given mirror tree before the corresponding main tree node has been returned. The prediction can be based on tracking information indicative of whether a given mirror tree has been allocated, and/or how many valid nodes have been established for the given mirror tree. The tracking information could track the number of valid nodes with different levels of precision. For example, the memory security unit 20 could maintain valid node counters which count how many nodes of a given mirror tree are valid, without specifying which particular nodes are valid in the tracking information (e.g. in this case the mirror tree node could be loaded speculatively when the valid node counter for that tree is greater than a certain threshold). Alternatively, the memory security unit 20 could maintain a bitmap indicating which particular nodes of the mirror tree are valid, which could allow an exact determination of whether a given mirror tree node will be needed. Either way, tracking the level of population of the mirror tree can help improve decisions on load scheduling to improve performance.

The method of FIG. 9 can be extended to implement the variable minor counter size example discussed above. In such an embodiment, when a minor counter overflows at step 276, then instead of proceeding direct to step 280, an additional step can be performed to check whether the minor counter size is already at a maximum minor counter size. If the minor counter size is already at the maximum size supported by the memory security unit 20, then the method can proceed to step 280 to increment the major counter associated with the target block, and the method continues beyond step 280 as described above. However, if the minor counter size has not yet reached the maximum size supported, then the memory security unit 20 increases the size of the minor counters associated with the node of the main tree which included the overflowed minor counter. Hence, the main node and at least one corresponding node 404 in a mirror tree 400 are rewritten so that the number of bits in each counter is expanded (as described above, by shifting one or more bits from the major counter to each minor counter and padding the major counter with leading zeroes), and the expanded minor counter values are distributed among the space reserved for minor counters in the main node itself and the one or more corresponding nodes 404 of mirror trees 400. If no space has yet been allocated for a mirror tree 400 needed to accommodate the relevant size of minor counters, then space can be allocated by the memory security unit 20 at this time. The method then proceeds to step 278 of FIG. 9 and the remaining steps of FIG. 9 are the same as described above.

Figure 14:
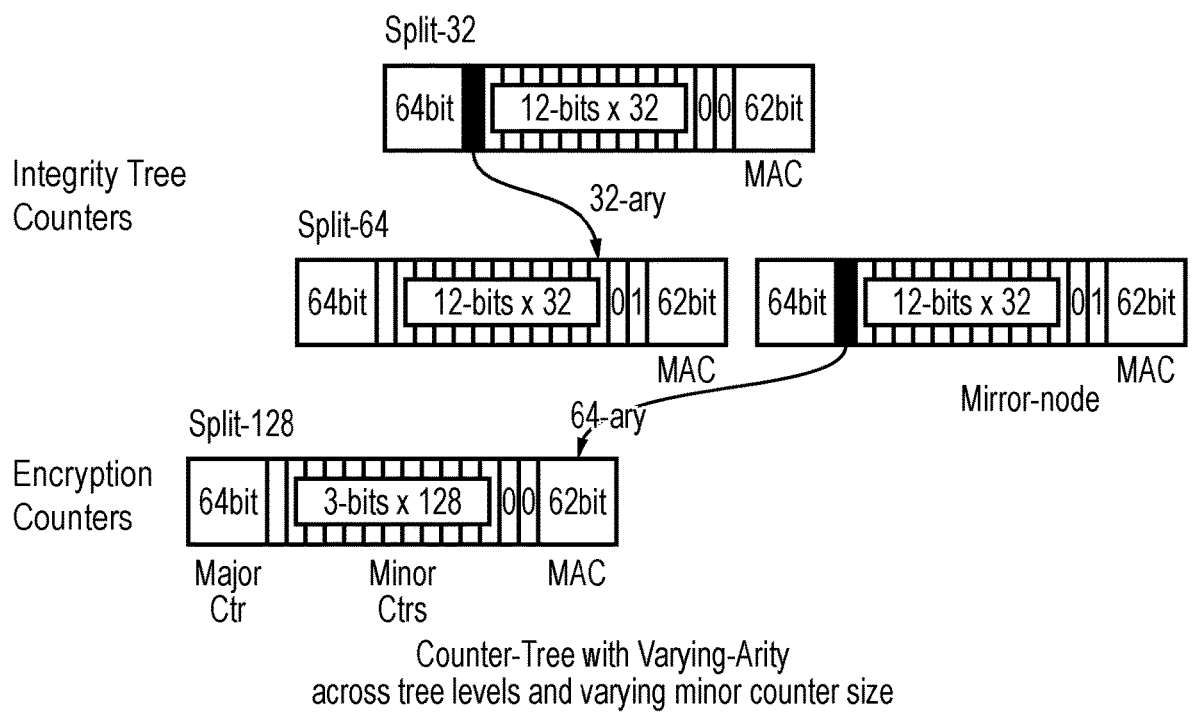
FIG. 14 illustrates an example of a tree with varying arity and variable minor counter size.

While the example of FIGS. 10 to 13 shows a case where each level of the tree has the same arity (128), again as in the previous examples it is also possible to provide trees with varying arity between levels of the tree, as shown in FIG. 14, which shows an example where a parent node is 32-ary and its child node is 64-ary. Initially, the parent node would have had 32 12-bit minor counters and the child node 64 6-bit minor counters, but following a size increase trigger event the size of the minor counters of the 64-ary child node was increased to 12, with an additional mirror node being allocated to accommodate half of the 12-bit counters of the 64-ary child node. A subsequent node of encryption counters (whose MAC is calculated using a counter of the 64-ary child node) may be 128-ary. While FIG. 14 shows power of 2 arity for each node, it is also possible to provide an arity that is not an exact power of 2 as discussed above.

In summary, above we describe a counter tree using split counters, with at least some levels using the split Counter Design. This allows us to construct an Integrity-Tree that is 16, 32, 64, or 128-ary (based on the Minor:Major Counter ratio of the Split-Counter Design chosen (16, 32, 64, 128, etc.)), as opposed to 8-ary trees (Counter Tree or MAC-Tree) in the comparative examples of FIGS. 2 and 3. This allows a reduction in the number of levels in the Counter-tree for protecting the same area of memory, leading to lesser memory traffic during tree traversal and subsequent improvement in performance. Additionally, larger number of minor counters per counter-cacheline, leads to better cacheability and reduces the number of memory accesses during tree-traversal (since the traversal continues only till a hit in cache).

We describe a variable-arity counter tree with different Split-Counter Designs at each level. A parent node minor counter is incremented on a write to any of the minor counters in the child node. Thus, as you go up in the tree, the write-traffic increases exponentially (ignoring the effect of caching). Therefore, we propose to reduce the arity of the tree as we go higher in the tree by using less aggressive Split-Counter Designs at each level. Our evaluations show that a Split-64 design sees significant overflows at the leaf-level (MAC recomputation taking up >50% of the execution time), while the Split-32 design sees negligible overflows (<1% time spent in MAC-recomputation). Therefore, we propose a design with Split-48 at the leaf-level (that has 48-minor counter per major counter) and reduce the ratio at the next level in the tree (Split-36 with 36-minor counters per major counters) and so on. This leads to an arity that is non-power of 2 and complicates the address calculation arithmetic, but that cost is reasonable to pay for exploiting additional performance benefit, without overhead of MAC re-computations.

We also propose a tree with variable minor counter size using mirror trees to accommodate the enlarged counters for certain nodes, which helps reconcile the competing demands of decreasing minor counter size (to enable increased arity and tree traversal performance) and increasing minor counter size (to reduce the likelihood of re-encryption or MAC re-computation being required when the minor counter overflows). With the mirror tree approach the nodes that require larger counters can use larger counters, but other nodes which are less frequently needed can still use smaller minor counters. The variable minor counter approach can be combined with the variable arity tree mentioned above, if desired, or a fixed arity version can be used where the arity is the same throughout the tree.

Figure 15:
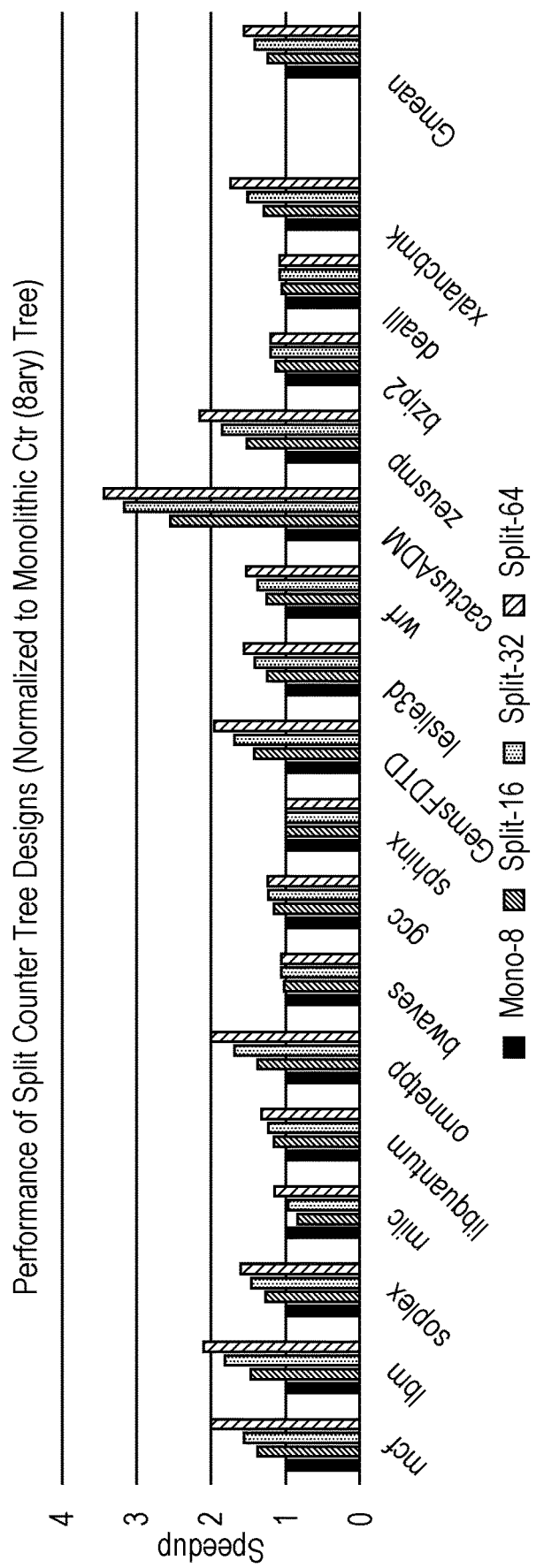
FIG. 15 is a graph comparing performance for different implementations of counter integrity tree.

FIG. 15 shows an evaluation of performance of different Split-Counter based Counter Trees:

left hand bar in each set of 4 bars: comparative approach with monolithic 56-bit counters (Mono-8).
second bar from the left of each set of 4 bars: Split16 (16-ary)
third bar from the left in each set of 4 bars: Split-32 (32-ary)
right hand bar in each set of 4 bars: Split-64 (64-ary).

The performance speedup is shown as a ratio relative to the Mono-8 bar for each benchmark, i.e. speedup ratio is always 1 for Mono-8. We assume a 32 KB Dedicated Counter Cache that caches encryption and integrity-tree counters on-chip. We evaluate performance of these configurations on the memory intensive workloads in SPEC2006 (>1 memory access per 1000 instructions). As shown in FIG. 10, Split-32 (32-ary) tree shows on average a speedup of 42% compared to a Monolithic counter (56-bit) Tree (8-ary). Split-16 Counter Tree shows a lesser speedup of 26% on-average. This is primarily because of improved cacheability of the Split-Counter Tree Nodes, leading to a reduction in memory-traffic. Split-64 shows a considerable speedup (57% on average) compared to Split-32 (42% on average). However, Split-64 also incurs a considerable cost due to overflows (spending>50% of time in handling MAC-recomputations), which are not accounted for in the performance model. As a result, Split-32 is a more preferred conservative design for a Counter-tree with a static arity, i.e. same design for counters across levels. However, given the difference between Split-32 and Split-64 in performance, and the fact that there are considerable overflows in Split-64 while negligible in Split-32, we can find a middle-ground in Variable, Non-Powers of 2 arity Split-Counter Trees as shown in FIG. 5.

Figure 16:
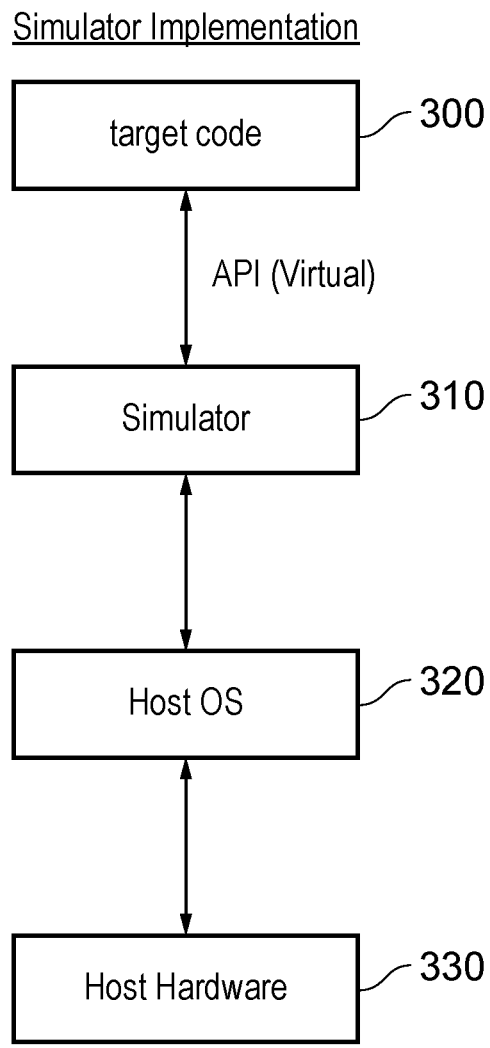
FIG. 16 shows a simulator example that may be used.

FIG. 16 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 which is the same as the application program interface of the hardware architecture being modelled by the simulator program 310. Thus, the program instructions of the target code 300, including instructions for reading or writing data in the off-chip memory 14, may be executed from within the instruction execution environment using the simulator program 310, so that a host computer 330 which does not actually have the memory security unit 20 provided in hardware as discussed above can emulate these features.

Further example arrangements are set out in the following clauses:

(1) An apparatus comprising:
memory access circuitry to control access to data stored in a memory; and
memory security circuitry to verify integrity of data stored in a protected memory region of the memory; wherein:
the memory security circuitry is configured to maintain a counter integrity tree comprising a plurality of nodes, each node specifying a plurality of counters associated with respective data blocks of the protected memory region, the plurality of nodes comprising at least one parent node for which at least one of the counters is associated with a data block storing a child node providing further counters of the counter integrity tree, and at least one leaf node for which at least one of the counters is associated with a data block storing data other than the counter integrity tree;
in response to access to a target data block of the protected memory region, the memory security circuitry is configured to verify integrity of the target data block by comparing a stored authentication code associated with the target data block with a calculated authentication code generated based on the target data block and a target counter of the counter integrity tree which is associated with the target data block; and at least one of the nodes of the counter integrity tree comprises a split-counter node specifying at least two counters each defined as a combination of a major count value shared between the at least two counters and a respective minor count value specified separately for each of the at least two counters.

(2) The apparatus according to clause (1), comprising a second memory;
wherein the memory security circuitry is configured to store, to the second memory, root verification data specifying:
a root node of the counter integrity tree; or
information for verifying the integrity of the root node of the counter integrity tree stored in the protected memory region.

(3) The apparatus according to clause (2), wherein in response to access to the target data block, the memory security circuitry is configured to perform one or more verification checks to verify the integrity of counters on a branch of the counter integrity tree including the target counter and the root node, and at least one of the verification checks is dependent on the root verification data stored in the second memory.

(4) The apparatus according to clause (1), wherein in response to updating the target data block of the protected memory region, the memory security circuitry is configured to update the target counter and recalculate the stored authentication code associated with the target data block based on the updated data of the target data block and the updated target counter.

(5) The apparatus according to clause (4), wherein the memory security circuitry is configured to update the target counter by incrementing the target counter.

(6) The apparatus according to clause (1), wherein in response to updating the target data block of the protected memory region when the target counter for the target data block is specified by a split-counter node of the counter integrity tree, the memory security circuitry is configured to update the minor count value corresponding to the target counter and recalculate the stored authentication code associated with the target data block based on the updated data of the target data block, a corresponding major count value corresponding to the target counter and the updated minor count value corresponding to the target counter.

(7) The apparatus according to clause (6), wherein when the update to the minor count value causes an overflow condition, the memory security circuitry is configured to update the corresponding major count value and to recalculate the stored authentication codes associated with each of the data blocks associated with counters sharing the corresponding major count value.

(8) The apparatus according to clause (1), wherein at least one of said at least one parent node is a split-counter node.

(9) The apparatus according to clause (1), wherein the counter integrity tree comprises at least two split-counter nodes at different levels of the counter integrity tree.

(10) The apparatus according to clause (1), wherein the counter integrity tree comprises at least two nodes specifying counters for different numbers of data blocks.

(11) The apparatus according to clause (1), wherein the counter integrity tree comprises a first split-counter node specifying counters for a first number of data blocks, and a second split-counter node specifying counters for a second number of data blocks greater than the first number, wherein the first split-counter node is the parent node of the second split-counter node.

(12) The apparatus according to clause (11), wherein the minor count values specified by the first split-counter node have a greater number of bits than the minor count values specified by the second split-counter node.

(13) The apparatus according to clause (11), wherein the parent node of the first split-counter node is a split-counter node specifying counters for a third number of data blocks smaller than the first number.

(14) The apparatus according to clause (1), wherein at least one node of the counter integrity tree specifies counters for a number of data blocks other than an exact power of 2.

(15) The apparatus according to clause (1), wherein the memory security circuitry is configured to read the stored authentication code for the target data block from the same cache line as the target data block.

(16) The apparatus according to clause (1), wherein in response to the access to the target data block, the memory security circuitry is configured to trigger a security violation response when a mismatch is detected between the stored authentication code and the calculated authentication code.

(17) The apparatus according to clause (1), wherein the memory security circuitry comprises encryption/decryption circuitry to encrypt data written to a data block of the protected memory region and to decrypt data read from a data block of the protected memory region.

(18) The apparatus according to clause (1), wherein the memory access circuitry is configured to control access to an unprotected memory region of the memory independent of the counter integrity tree.

(19) A method for controlling access to data stored in a protected memory region of a memory, comprising:
maintaining a counter integrity tree comprising a plurality of nodes, each node specifying a plurality of counters associated with respective data blocks of the protected memory region, the plurality of nodes comprising at least one parent node for which at least one of the counters is associated with a data block storing a child node providing further counters of the counter integrity tree, and at least one leaf node for which at least one of the counters is associated with a data block storing data other than the counter integrity tree; and
in response to access to a target data block of the protected memory region, verifying integrity of the target data block by comparing a stored authentication code associated with the target data block with a calculated authentication code generated based on the target data block and a target counter of the counter integrity tree which is associated with the target data block;
wherein at least one of the nodes of the counter integrity tree comprises a split-counter node specifying at least two counters each defined as a combination of a major count value shared between the at least two counters and a respective minor count value specified separately for each of the at least two counters.

(20) A non-transitory storage medium storing a computer program to control a data processing apparatus to perform the method of clause (19).

(21) A computer program for controlling a host data processing apparatus to provide an instruction execution environment may be provided, the computer program comprising:

memory access program logic to control access to data stored in a memory; and memory security program logic to verify integrity of data stored in a protected memory region of the memory; wherein:

the memory security program logic is configured to maintain a counter integrity tree comprising a plurality of nodes, each node specifying a plurality of counters associated with respective data blocks of the protected memory region, the plurality of nodes comprising at least one parent node for which at least one of the counters is associated with a data block storing a child node providing further counters of the counter integrity tree, and at least one leaf node for which at least one of the counters is associated with a data block storing data other than the counter integrity tree;

in response to access to a target data block of the protected memory region, the memory security program logic is configured to verify integrity of the target data block by comparing a stored authentication code associated with the target data block with a calculated authentication code generated based on the target data block and a target counter of the counter integrity tree which is associated with the target data block; and at least one of the nodes of the counter integrity tree comprises a split-counter node specifying at least two counters each defined as a combination of a major count value shared between the at least two counters and a respective minor count value specified separately for each of the at least two counters.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
a memory controller to control access to data stored in a memory; and
a memory security unit to verify integrity of data stored in a protected memory region of the memory,
wherein:
the memory security unit is configured to maintain a main counter integrity tree comprising a plurality of nodes, each node specifying a plurality of counters associated with respective data blocks of the protected memory region, the plurality of nodes comprising at least one parent node for which at least one of the counters is associated with a data block storing a child node providing further counters of the main counter integrity tree, and at least one leaf node for which at least one of the counters is associated with a data block storing data other than the main counter integrity tree, in response to access to a target data block of the protected memory region, the memory security unit is configured to verify integrity of the target data block by comparing a stored authentication code associated with the target data block with a calculated authentication code generated based on the target data block and a target counter of the counter integrity tree which is associated with the target data block, at least one of the nodes of the main counter integrity tree comprises a split-counter node specifying at least two counters each defined as a combination of a major count value shared between the at least two counters and a respective minor count value specified separately for each of the at least two counters, and in response to a size increase trigger event associated with a given split-counter node of the main counter integrity tree, the memory security unit is configured to increase a size of the minor counters of the given split-counter node and to allocate a subset of the minor counters of the given split-counter node in a corresponding split-counter node of at least one mirror counter integrity tree.

2. The apparatus according to claim 1, in which the given split-counter node specifies a size field indicative of a size of the minor counters of the given split-counter nodes.

3. The apparatus according to claim 1, in which in response to the size increase trigger event when the minor counters of the given split-counter node have a size other than a maximum size supported by the memory security circuitry, the memory security unit is configured to increase the size of the minor counters of the given split-counter node to a next largest size among a plurality of minor counter sizes supported by the memory security circuitry.

4. The apparatus according to claim 1, in which for split-counter nodes for which the size of the minor counters is to be greater than two times a minimum minor counter size supported by the memory security circuitry, the memory security unit is configured to allocate corresponding split-counter nodes in at least two mirror counter integrity trees.

5. The apparatus according to claim 1, in which in response to the size increase trigger event when memory space has not yet been allocated for the at least one mirror counter integrity tree, the memory security unit is configured to allocate memory space for the at least one mirror counter integrity tree.

6. The apparatus according to claim 1, in which for each mirror counter integrity tree, the memory security unit is configured to allocate the same amount of memory space as an amount of memory space allocated for the main counter integrity tree.

7. The apparatus according to claim 1, in which a first offset between an address of the corresponding split-counter node of a given mirror counter integrity tree and a base address of the given mirror counter integrity tree is equal to a second offset between an address of the given split-counter node of the main counter integrity tree and a base address of the main counter integrity tree.

8. The apparatus according to claim 1, in which the size increase trigger event comprises at least one of:
a minor counter overflow of one of the minor counters of the given split-counter node; and
a rate of overflows of minor counters of the given split-counter node meeting a predetermined condition; and a rate of authentication code re-computations or data re-encryption events for data blocks associated with counters of the given split-counter node exceeding a threshold.

9. The apparatus according to claim 1, in which the size increase trigger event comprises detecting that a level of memory traffic associated with an associated subset of the protected region is greater than a threshold, the associated subset of the protected region comprising a portion of the protected region for which verifying integrity of any target block within the associated subset is dependent on the given split-counter node.

10. The apparatus according to claim 1, further comprising:
a second memory,
wherein the memory security unit is configured to store, to the second memory, root verification data specifying:
a root node of the main counter integrity tree, or
information for verifying the integrity of the root node of the main counter integrity tree stored in the protected memory region.

11. The apparatus according to claim 10, wherein in response to access to the target data block, the memory security unit is configured to perform one or more verification checks to verify the integrity of counters on a branch of the main counter integrity tree including the target counter and the root node, and at least one of the verification checks is dependent on the root verification data stored in the second memory.

12. The apparatus according to claim 1, wherein when accessing a given node of the main counter integrity tree, the memory security unit is configured to predict a minor counter size associated with the given node of the main counter integrity tree before the given node of the main counter integrity tree is available.

13. The apparatus according to claim 12, wherein the memory security unit is configured to determine whether to trigger a request to access a corresponding node of the mirror counter integrity tree depending on the predicted minor counter size.

14. The apparatus according to claim 1, wherein in response to updating the target data block of the protected memory region when the target counter for the target data block is specified by a split-counter node of the main counter integrity tree, the memory security unit is configured to update the minor count value corresponding to the target counter and recalculate the stored authentication code associated with the target data block based on the updated data of the target data block, a corresponding major count value corresponding to the target counter and the updated minor count value corresponding to the target counter.

15. The apparatus according to claim 1, wherein the main counter integrity tree comprises at least two nodes with different arity.

16. The apparatus according to claim 1, wherein at least one node of the main counter integrity tree specifies counters for a number of data blocks other than an exact power of 2.

17. The apparatus according to claim 1, wherein the memory security unit is configured to read the stored authentication code for the target data block from the same cache line as the target data block.

18. The apparatus according to claim 1, wherein the memory controller is configured to control access to an unprotected memory region of the memory independent of the main counter integrity tree.

19. A method for controlling access to data stored in a protected memory region of a memory, comprising:
maintaining a main counter integrity tree comprising a plurality of nodes, each node specifying a plurality of counters associated with respective data blocks of the protected memory region, the plurality of nodes comprising at least one parent node for which at least one of the counters is associated with a data block storing a child node providing further counters of the main counter integrity tree, and at least one leaf node for which at least one of the counters is associated with a data block storing data other than the main counter integrity tree; and
in response to access to a target data block of the protected memory region, verifying integrity of the target data block by comparing a stored authentication code associated with the target data block with a calculated authentication code generated based on the target data block and a target counter of the main counter integrity tree which is associated with the target data block;
wherein at least one of the nodes of the main counter integrity tree comprises a split-counter node specifying at least two counters each defined as a combination of a major count value shared between the at least two counters and a respective minor count value specified separately for each of the at least two counters; and
in response to a size increase trigger event associated with a given split-counter node of the main counter integrity tree, increasing a size of the minor counters of the given split-counter node and allocate a subset of the minor counters of the given split-counter node in a corresponding split-counter node of at least one mirror counter integrity tree.

20. A non-transitory storage medium storing a computer program to control a data processing apparatus to perform the method of claim 19.

* * * * *